(12) United States Patent
Olivier

(10) Patent No.: US 6,780,637 B2
(45) Date of Patent: Aug. 24, 2004

(54) DISPOSAL APPARATUS AND METHOD FOR EFFICIENTLY BIO-CONVERTING PUTRESCENT WASTES

(76) Inventor: Paul A. Olivier, 317 N. Bridge St., Washington, LA (US) 70589

(*) Notice: Subject to any disclaimer, the term of this patent is extended or adjusted under 35 U.S.C. 154(b) by 0 days.

(21) Appl. No.: 10/247,083

(22) Filed: Sep. 19, 2002

(65) Prior Publication Data
US 2003/0143728 A1 Jul. 31, 2003

Related U.S. Application Data
(60) Provisional application No. 60/352,189, filed on Jan. 25, 2002.

(51) Int. Cl.$^7$ ................................................ C12M 1/00
(52) U.S. Cl. .................... 435/290.4; 435/262; 220/557; 220/654; 220/698
(58) Field of Search ................................ 220/557, 654, 220/698; 435/290.1, 290.4, 262

(56) References Cited

U.S. PATENT DOCUMENTS

| | | | |
|---|---|---|---|
| 4,040,810 A | | 8/1977 | Eby et al. |
| 4,762,241 A | * | 8/1988 | Lang ........................... 215/250 |
| 4,953,744 A | * | 9/1990 | Koyama ................ 220/495.11 |
| 5,366,107 A | * | 11/1994 | Rostkowski ................ 220/676 |
| 5,741,344 A | | 4/1998 | Warkentin |
| 5,759,224 A | | 6/1998 | Olivier |
| 6,001,146 A | | 12/1999 | Olivier |
| 6,391,620 B1 | | 5/2002 | Olivier |

FOREIGN PATENT DOCUMENTS

WO   WO 01/32586 A1   5/2001

OTHER PUBLICATIONS

B. Kaspers, et al., "Evaluation of a Conveyor Belt Waste Collection System for Swine; Fecal Drying Efficiency and Ammonia Emission Reductions," http://mark.asci.ncsu.edu/SwineReports/2002/kaspers.htm.

J.B. Koger, et al., "Re–Cycle": An Environmentallly Sound System for Hog Waste Management, http://mark.asci.ncsu.edu/SwineReports/2002/koger.htm.

* cited by examiner

Primary Examiner—David A. Redding
(74) Attorney, Agent, or Firm—Rudolph J. Buchel, Jr.

(57) ABSTRACT

The present invention is directed to a method and system of system for efficiently bio-converting putrescent wastes to a more usable form. The present "domestic" unit does not utilize a motor nor does in contend any moving parts. Instead, the domestic unit generally comprises a generally rounded container with two small ramps on the inside of the container. The two ramps begin at the bottom of the container and spiral up to the top of the container, where they adjoin a discharge pipe. In operation, the putrescent waste is deposited into the domestic unit container. Mature larvae have only one avenue of escape from the putrescent waste, up the ramps and into discharge pipe and onto collection tubes where the larvae are collected and processed. When the container fills up with larval residue, the larvae are removed from the container, the container is emptied of residue, and the larvae are put back into the container. Because the container may be fabricated in any size, from a wide variety of materials, smaller containers can be manually tended.

33 Claims, 11 Drawing Sheets

Prior Art Bio-Conversion Facility for
Putrescent Wastes
100

Prior Art

Prior Art Bio-Conversion Facility for Putrescent Wastes
200

Cross Section Of Prior Art
Disposal Track
300

Domestic Disposal Container
401

(Cross-Sectional Front View)
500

(Side View)
500

(Front View)
500

(Back View)
500

(Top View)
501

(Top View)
501

Collection Units
(Top View)

Transfer Station
(Cross Sectional View)
850

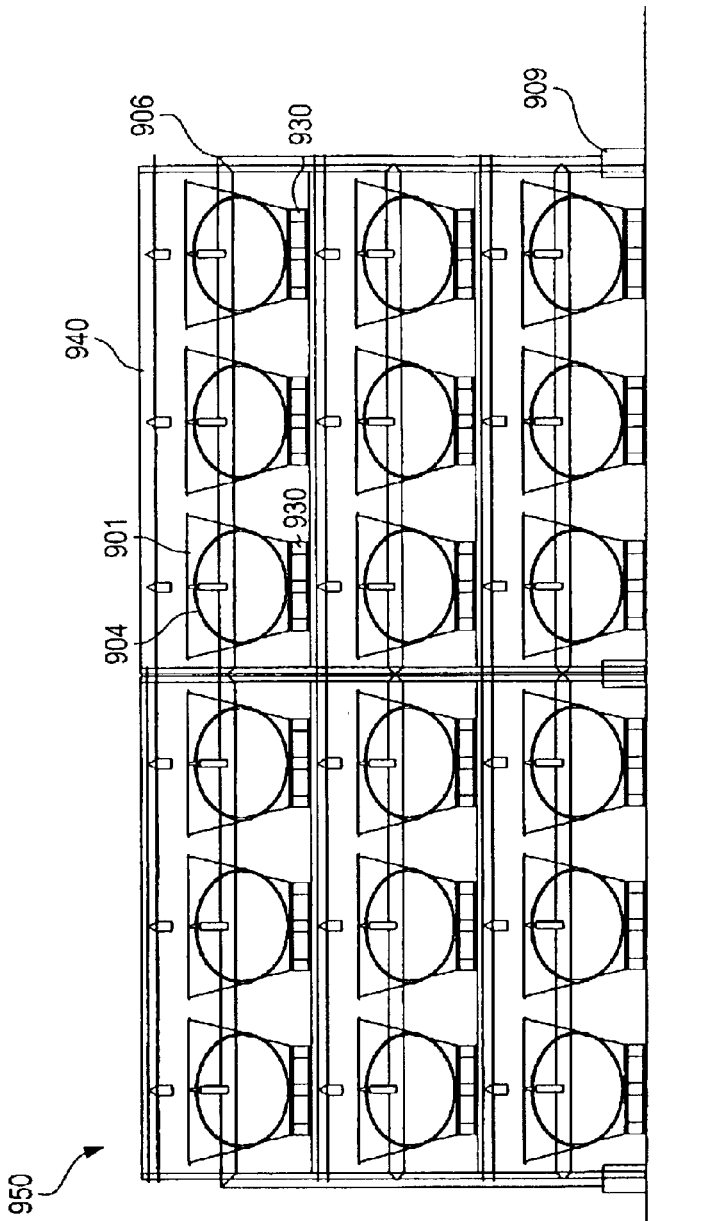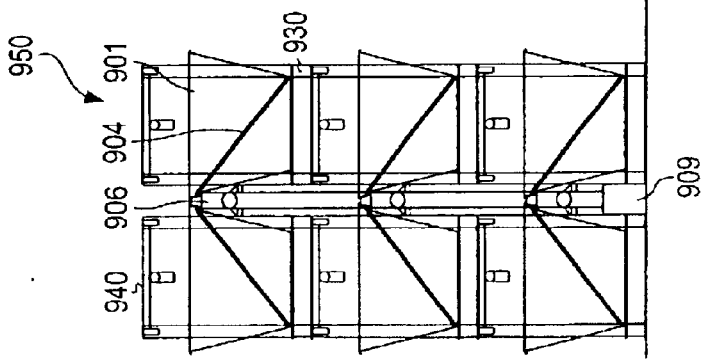

(Side View of Levels 1 - N)
1060

(Top View of Levels 1 - N)
1060

DISPOSAL APPARATUS AND METHOD FOR EFFICIENTLY BIO-CONVERTING PUTRESCENT WASTES

CROSS-REFERENCES TO RELATED APPLICATIONS

This application is related to and claims priority from, co-pending U.S. Provisional Application No. 60/352,189 filed Jan. 25, 2002 by Paul A. Oliver titled "DISPOSAL APPARATUS AND METHOD FOR EFFICIENTLY BIO-CONVERTING PUTRESCENT WASTES, and is hereby incorporated herein by reference in its entity.

BACKGROUND OF THE INVENTION

1. Field of the Invention

The present invention relates in general to apparatus and method for disposal of putrescent waste material, and in particular the continuous bio-conversion of putrescent waste material.

2. Description of Related Art

Society generates huge quantities of putrescent waste:
farm waste from plants, animals, and birds;
food storage waste;
commercial food preparation waste;
kitchen waste (institutional, restaurant & domestic);
plate waste; and
human waste.

The production of organic compost for municipal refuse or garbage is well known. For example, U.S. Pat. No. 5,082,486 filed on Nov. 16, 1990 by Glogowski teaches a method for the production of organic compost comprising the following steps:

1. shredding the refuse;
2. adding water to saturation;
3. adding earthworms;
4. keeping the water content at more than 80% during at least 30 days; and
5. keeping the mixture at a temperature from 0–54° C. and with a moisture of at least 45% during more than 4 months.

Such a method is not suitable for continuous treatment of large amounts of putrescent waste. Furthermore, the separation of earthworms from the treated waste materials is very difficult.

The prior art suggests various types of bio-conversion facilities for facilitating the production of useful animal products from putrescent waste material. One device and associated method relates to the continuous treatment of large amounts of humid putrescent waste materials by means of fly larvae. Thus, after a relatively short period of a few days, the putrescent waste is converted into a slightly moist odor-free compost. After treatment of the waste materials, the use of fly larvae allows for separation of the larvae from the waste. Live or dehydrated larvae constitute an excellent feed stock for fish and poultry, but the larvae can also be used for the production of by-products such as protein meal, fats, chitin, and chitosan. It has been observed that when using fly larvae for the treatment of putrescent waste materials, it is possible to induce them to crawl out of the waste by exposing the waste to an illumination, preferably together with a heating, especially an infrared illumination, whereby the separation of the larvae out of the putrescent waste is obtained by the larvae themselves.

The Black Soldier Fly

The larvae that we have chosen for this waste disposal process is the larvae of the black soldier fly (*Hermetic illucens*). It is a tropical fly indigenous to the Americas, from the southern tip of Argentina to Boston and Seattle. During World War II, the black solider fly (BSF) spread throughout the world. Today, it can be found in China, Japan, Korea, the Philippines, Vietnam, Laos, Cambodia, Thailand, Indonesia, Singapore and even Australia. Unlike many other flies, BSF adults do not go into houses; they do not have functional mouth parts; they do not eat waste; they do not regurgitate on human food; and therefore, they are not associated in any way with the transmission of disease. BSF adults do not bite, bother or pester humans in any way. Even though BSF larvae have been known to survive inside the human gut if swallowed whole, this is extremely rare and poses absolutely no danger to humans.

BSF adults are around only for the purpose of mating and laying eggs. The adults congregate in small numbers near a secluded bush or tree in order to find and select a mate. After mating, the female searches for a suitable place to lay her eggs. She produces about 900 eggs in her short life of 5 to 8 days. (Housefly adults, by contrast, live up to 30 days.) Half of the population of adult black soldier flies (the males) never go near waste, since males to not lay eggs. Actually, the females prefer not to lay their eggs upon the waste, but either above or to the side of the waste. In this way, the eggs have a far better chance of surviving. The eggs are very slow in hatching (102 to 105 hours). The newly hatched larvae then crawl or fall onto the waste and begin to eat and digest it with amazing speed.

Under ideal conditions, it takes about two weeks for the larvae to reach maturity. If the temperature is not right (above 21° C. or 70° F.), or if there is not enough food, this period of two weeks may extend to four months. This ability of the BSF larva to extend its life cycle under conditions of stress is a very important reason why it was selected for this waste disposal process. BSF larvae pass through five stages or instars. Upon reaching maturity, the larvae are about 25 mm (1 in.) long, 6 mm (0.24 in.) in diameter, and they weight about 0.2 gm (0.0014 oz.). The larvae are extremely tough and robust. They can survive under conditions of extreme oxygen deprivation. It takes them, for example, approximately two hours to die when submerged in rubbing alcohol. They can be subjected to several 1000 g's of centrifugation without harming them in any way. BSF larvae are strong, robust, flexible, adaptable, and very easy to manage.

But their greatest attribute, of course, lies in their ability to eat and digest raw waste. They can devour, for example, a large, raw Irish potato in just a few hours. Many species of flies cannot eat raw waste, unless the waste first undergoes a certain level of bacterial decomposition. Not so with the larvae of the black soldier fly. Since the BSF larvae have very large mouth parts, they can shred and ingest raw waste far more efficiently than any other known species of fly. The only things that they cannot shred are large pieces of food waste of a high cellulosic, calcium or chitin content, such as the shell of a coconut, crab or shrimp, or a piece of bone. Therefore, it would be advisable for us to shred these tough objects to a grain size small enough to be ingested by the BSF larvae. This also assures a relatively uniform grain size with respect to the larvae residue.

BSF larvae have amazing appetites. In a small experiment conducted in Texas over a period of one year, it was determined that the BSF larvae can digest over 15 kg of raw waste per $m^2$ of disposal per day (approximately 3 lbs./$ft^{2/}$day). As a sidebar, it is also noted that within a single day this 15 kg of waste was reduced to less than 1.5 kg of larval residue. In other words, an optimal bio-conversion processes utilizing the BSF may expect a 90% reduction in the weight and volume of the food waste within a 24-hour period. On the surface of the disposal unit, one finds a thick layer of actively feeding larvae in all stages of growth. The moment the food waste is deposited into the unit, it is digested by the BSF larvae long before it has had a chance to degrade complex organic compounds. Therefore, most of the nutrients and energy within the waste are conserved and recycled with the help of the BSF.

While actively feeding, the larvae secrete a chemical, more precisely an infochemical, that permits them to communicate with other species of flies. This infochemical or synomone allows them to tell other flies to stay away, that it makes little sense to lay their eggs within an area full of actively feeding BSF larvae. This interspecies communication is indeed very effective. In the vicinity of the disposal unit, we note the near absence of houseflies and all other flies that are a pest to humans. If only we could isolate this natural fly repellant produced by the BSF larvae! After about two weeks of feeding, the BSF larvae reach maturity. They turn from white to black, their mouth parts transform into a digger, they empty their guts of waste, they secrete an antibiotic to protect themselves from bacteria, and they set out in search of an ideal pupation site.

An Ideal Pupation Site

The BSF larvae will easily crawl over 100 meters (320 ft.+) in search of an ideal pupation site. An ideal pupation site must be free of the enormous bacteriological activity which characterizes the waste disposal area, free of small predators such as predatory mites and pseudo-scorpions, and free as well of large predators such as birds, rats and mice. Furthermore, an ideal pupation site is never simply out in the open. It must be a shaded, dry area providing refuge or cover for the mature pre-pupal larvae. BSF larvae are negatively phototactic (afraid of light), and therefore most of their migratory activity takes place at night. Their migration initially appears to be a random search for a way out of the waste. If a ramp of an upward inclination lies at the edge of the waste, they will make every effort to climb up this ramp.

As long as the ramp has an angle of less than 45 degrees, the BSF larvae have no problem exiting the waste. Such a steep angle makes it difficult for the larvae to drag or carry along any adhering residue, and it also serves as a barrier for the larvae of most other species of fly. Housefly larvae, for example, are not even able to climb a ramp of a 30-degree angle. If housefly larvae cannot get out of the disposal area, they cannot pupate, and if they cannot pupate, they cannot become adults and reproduce. The BSF waste disposal unit mounted with steep ramps serves as a very effective sink or trap for the larvae of just about every species of flies that ignores the chemical warning to stay away from the unit. Once trapped within the unit, the uninvited larvae and pupae eventually become one more food item for the hungry BSF larvae.

After crawling up the ramp, the BSF larvae will continue in search of an ideal pupation site. If the ramp discharges into a horizontal pipe, the larvae will crawl over this pipe, over relatively large distances, until they come to downspout that discharges into a bucket. BSF larvae are totally self-harvesting. They abandon the waste only when they have reached their final mature pre-pupal stage, and they crawl out of the waste into a container without any mechanical or human intervention.

Analysis of Dried Soldier Fly Larvae 42.1% crude protein
34.8% ether extract
7.0% crude fiber
7.0% moisture
1.4% nitrogen free extract (NFE)
14.6% ash
5.0% calcium
1.5% phosphorus
(Source: Newton, Booram, Barker & Hale, 1977)

The Value of the Soldier Fly Larvae

Studies were conducted at the Coastal Plain Experiment Station in Tifton, Ga., to examine the suitability of BSF larvae as a feed source for channel catfish and tilapia. The test concluded that "soldier fly larvae should be considered a promising source of animal protein in fish production." Taste tests were also conducted: "Results of the taste tests indicated that fish fed soldier fly larvae are acceptable to the consumer." Vietnam produces large quantities of catfish, and BSF larvae could become a significant source of nutrients to the catfish industry in Vietnam. (See Bondari and Sheppard (1980), pp. 103 and 108).

Also, BSF larvae contain a high percentage of dry matter: 44%. The catfish industry in the United States buys approximately 600,000 TPY (tons per year) of catfish food at an average wholesale price of $550 per ton. If one dry ton of BSF larvae should have a value of $400 as a feed ingredient in catfish food, then one ton of food waste could generate the equivalent of about $40 in catfish food ($400*20%/2). If each transfer station received one ton of food waste per day, then this represents per transfer station approximately $40 per day, $1,200 per month, or $14,600 per year. But the value of BSF larvae is not limited to the catfish industry.

As a polysacharide, chitin is one of the most abundant substances within nature. Through a process of deacetylation, chitin can be made soluble in water. This soluble form of chitin is called chitosan, a polycationic carbohydrate polymer. Chitosan has a value ranging from $4,000 to $10,000 per ton, depending on purity and other quality specifications. Furthermore, it has been determined that the chitin content of BSF larvae on a dry basis is approximately 20.4%. If 80% of the BSF chitin converts to chitosan at a value of $4,000 per ton, then one ton of fresh larvae represents over $281 in chitosan alone.

The Value of Food Waste

If one ton of fresh larvae represents $133 of protein and fats, and an additional $281 in chitosan, then one ton of fresh larvae has a total value of over $400. To this must be added the value of the larval/redworm potting soil at approximately $100 per ton. At a conversion rate of fresh food waste into fresh larvae of 20%, then one ton of food has a value of about (400/5+10) $90. The entire effort to recycle food waste is driven by the value of the products and byproducts derived from this waste.

FIG. 1 is a flow diagram of a prior art bio-conversion facility for continuous treatment of putrescent waste by means of fly larvae in which the fly larvae actually eat the waste. Facility 100 is further described by U.S. Pat. No. 5,759,224 filed on Aug. 22, 1996 by Paul A. Oliver and is incorporated by reference herein in its entirety. Facility 100 comprises walls 101 defining fly larvae cultivation chamber 102 for the treatment of putrescent waste. A stack of at least two conveyor belt systems 108, each having a waste reception zone 108A, a treatment zone 108B in which the putrescent waste is more or less completely eaten by fly larvae, and an evacuation zone 108C, is designed so as to transport the waste and the fly larvae eating the waste from the reception zone 108A towards the evacuation zone 108C. A system 130 grinds putrescent waste material to be treated so as to form a pulp containing particles of more or less uniform grain size, the grain size being preferably smaller than the size of the mature fly larvae mouth, and a blending and holding tank 140 contains the ground putrescent waste. Pump 148 transfers the waste from the blending and holding tank 140 to paddle box 131. Variable speed control system 149 for pump 148 controls the discharge rate of waste into paddle box 131. A pipe or other transfer means 150 is used to transfer the ground waste from pump 148 into paddle box 131, the pipe or transfer means 150 being provided with heating system 144.

Valve 151 is mounted on pipe 150 to select sequentially the specific paddle box 131 and conveyor belt 108 that are to receive the waste. The distribution paddle box 131 has paddles that, in the preferred embodiment, turn in a direction opposite the flow of material so as to ensure a more or less even deposition of the ground putrescent waste down an inclined chute onto the central section of a long conveyor belt (80–100 meters), leaving the lateral surfaces of the conveyor belt free of waste. One or more distribution bags 110 contain an aqueous suspension of fly larvae eggs, the bags 110 being made preferably of plastic, and being connected to one or more tubes 145 through which the suspension liquid containing eggs drops onto the waste exiting the paddle box. A container with holes in the bottom could also be used to drip larvae onto the conveyor belt 108. A motor and speed reducer drives the conveyor belt 108; the motor being associated with a system well known in the art for controlling the speed of the conveyor belt 108. An air-conditioning system 112 controls the most appropriate temperature, humidity, and oxygen content in the fly larvae cultivation chamber (for example, between 28° C.–38° C. [82° F.–100° F.] between 30–90% relative humidity), depending on the species of fly larvae used. An air-scrubbing system 113 deodorizes the waste material leaving the fly larvae cultivation chamber in a well-known manner.

Infrared lamps 115 are located in evacuation zone 108C for inducing the larvae to crawl out of the waste. Two troughs 116, one on each lateral side of the conveyor belt (not shown), collect and transport the larvae falling or sliding from conveyor belt 108, each trough 116 having a water inlet (inlet 117) so as to create a high-speed water stream for transporting the larvae out of the trough, as well as an outlet (outlet 147) for evacuating the water and fly larvae. Transfer pipe 146 connects outlet 147 of a first conveyor belt trough to inlet 117 of a second conveyor belt trough, the second conveyor belt preferably being situated below the first. Pipe 118 through which the water stream with larvae flows toward a central rinsing and de-watering device 119 that may be, for example, a vibratory de-watering screen. Conveyor belt scraper 141 is used for scraping and cleaning the conveyor belt and for transferring the fly larvae residue onto chute 142. Centralized conveyor belt 143 receives waste from one or more waste chutes 142 and a storage area or surge bin (not shown) receives the waste from conveyor belt 143. A variable speed control system 123 is used to determine the speed or the intermittent movement of the conveyor belt (for example, if the larvae in the evacuation zone have not reached optimal maturation, the speed of the conveyor belt is reduced so as to increase the residence time of the larvae on the conveyor belt). System 132, shown in phantom lines in FIG. 1 and well known in the art, may be used for measuring the thickness of the waste deposited on the conveyor belt and controlling the amount of eggs or larvae to be added to the waste, so that the appropriate amount of eggs or larvae is added according to the thickness of waste on the belt, the system controlling, for example, the outlet of eggs or larvae from the distribution box 110. System 138, well known in the art, can be used for determining the presence of heavy metals or other contaminants in the waste, the system preventing the entry of contaminated waste into the blending and holding tank 140.

Paddle box 131 ensures an even deposition of the waste from a chute incorporated in paddle box 131, between distribution arms, on conveyor belt 108, but not over the entire width of the conveyor belt 108. This leaves the lateral surfaces of conveyor belt 108 adjacent to the lateral edges free of waste. The lateral surfaces are preferably about 10 cm in width and are provided with pins, needles, bristles, indentations, or holes, all of which may serve as a means for improving the detachment of waste particles adhering to the larvae crawling off the conveyor belt.

Upon reaching maturity, fly larvae naturally crawl out of the waste but, since they do not all reach maturity at exactly the same time, infrared lamps 115 are used for inducing the fly larvae to crawl out of the waste and off the conveyor belt in a synchronized and orderly manner. Even the direction in which the fly larvae crawl can be controlled by means of the graduated application of light and heat. Lamps 115 are preferably mounted in the form of a triangle, with one corner of the triangle intersecting the vertical plane passing through the middle line of the conveyor belt as shown so as to induce the fly larvae to crawl left and right of the middle line. When the conveyor belt is in motion, preferably all the lamps within the triangle are ON. When the conveyor belt is not in motion, preferably only some of the lamps are ON, electively providing a barrier across which the fly larvae would be reluctant to crawl. Instead the mature fly larvae move laterally on conveyor belt 108 into one of the two troughs 116 on each lateral side of conveyor belt 108 for collection. The larvae collected in the trough 116 can be sold as live fly larvae, but preferably they are further treated in a plant 126 for producing protein meat, chitin, chitosan and other valuable products.

The above-described device and associated method discloses producing a continual supply of mature fly larvae by maintaining co-existing populations of fly larvae at different states of development. Putrescent waste materials and fly eggs are continually added to a conveyor belt on which fly larvae mature. Simultaneously, larval residue is continually scraped from the moving conveyor belt at a point on the conveyor after the fly larvae have matured. The larval residue may then be processed using an alternative bio-conversion process. Alternatively, the larval residue may be composted or sold as product. However, the above-described device is rather complex and expensive to construct, maintain and operate. Furthermore, in situ operations involving the invention are not cost effective because the putrescent waste material must be deposited on the conveyor belt in a specified position. This insures that the fly larvae extract the maximum nutritional value from the waste material prior to the larval residue being scraped from the conveyor belt.

FIG. 2 is a cutaway diagram of another prior art bio-conversion facility for treatment of putrescent waste. The example described below has been developed by Craig Sheppard, Jeffery K. Tomberlin and Larry Newton at the National Environmentally Sound Production Laboratory at the College of Agriculture & Environmental Sciences at The University of Georgia. Facility 200 may also bio-convert putrescent waste by means of fly larvae whereby the fly larvae actually eat the waste material or bacteria which occurs on the waste, as discussed above with respect to facility 100 shown in FIG. 1. However, unlike facility 100, facility 200 depicted in FIG. 2 may be an in situ facility co-located with the putrescent waste material producing operation.

Facility 200 depicts the bio-conversion of putrescent wastes from caged laying hens at an egg laying facility. Each laying hen excretes an amount of putrescent waste material and the fly larvae feed on the hen waste. Cages 244 are suspended in a staggered arrangement above disposal volume 202 in such a manner as to expose a maximum area of cage floor mesh to disposal area 202. By configuring cages 244 in such an arrangement, waste falls from cages 244 directly into disposal volume 202, thereby eliminating the need to transport the putrescent waste material to disposal volume 202. In the present arrangement, cages 244 are arranged in four separate stacks with walkways 242 on either side of each stack. Walkways 242 extend the length of facility 200, as do cages 244.

Positioned below walkways 242, disposal volume 202 is subdivided by wall 208. At either side of disposal area 202 ramps 204 are positioned which lead to collection tubes 206. Collection tubes 206 are fabricated with longitudinal openings adjacent to ramps 204 (not shown), which run the length of collection tubes 206. As the laying hens in cages 244 deposit putrescent waste into disposal area 202 fly eggs are introduced. Fly larvae hatch from the eggs. When the fly larvae mature, the mature larvae surface from the putrescent waste in search of a more favorable environment to pupate. Fly larvae feed in only the top few inches of waste, but interestingly a population of fly larvae will tend to self regulate its numbers in order to extract optimal nutrition from each layer of waste prior to reaching the maximum feeding depth of the fly larvae.

Once the fly larvae reach maturity, the mature larvae crawl out of the putrescent waste material and onto the surface. The fly larvae attempt to navigate off of the surface of disposal volume 202 and away from the waste, as the larvae no longer need to feed on the waste. Facility 200 affords the mature larvae with only one avenue of escape from the putrescent waste, up ramps 204 and into collection tubes 206 where the larvae are collected and processed.

The deposition of waste material and collection of mature fly larvae continue unabated until larval residue must be collected from disposal area 202. Larval residue is the byproduct of the putrescent waste material after the bio-conversion process. The larval residue is of no value to the fly larvae and therefore must be removed from beneath cages 244 in order to provide additional space for new putrescent waste. However, it is impossible to remove only the larval residue without also removing the colony of fly larvae feeding in the top layers of the putrescent waste. The larval residue may be removed manually with shovels or may instead be collected by the bucket of a front-end loader and transported from disposal volume 202.

While facility 200 has the advantage of being less complex and expensive to implement than bio-conversion facility 100 in FIG. 1 discussed above, it has a disadvantage of being less efficient than facility 100. With respect to facility 200, disposal area 202 contains a colony of fly larvae in different stages of development, from newly hatched larvae to mature larvae because new fly eggs are introduced to the waste as larvae leave the disposal area. The colony is homogeneously distributed across the top few inches of putrescent waste disposal volume 202. However, each time the larval residue is removed from disposal area 202 an entire colony of fly larvae is destroyed. Production of mature fly larvae can only resume after new fly eggs are laid and their larvae mature. Other inefficiencies inherent with facility 200 are due to the loss of the top few inches of putrescent waste before it can be fully converted by the fly larvae and problems associated with re-regulating the population of larvae with the rate of deposition from the laying hens. Finally, the efficiency of larval crawl-off within facility 200 tends to be quite low, since the larvae, in such a large disposal unit, have great difficulties finding the ramps and exiting the waste.

Another prior art method and bio-conversion facility for the treatment of putrescent waste has been disclosed by the present inventor in U.S. Non-Provisional Pat. No. 6,391,620 titled "DISPOSAL APPARATUS AND METHOD FOR EFFICIENTLY BIO-CONVERTING PUTRESCENT WASTES." U.S. Pat. No. 6,391,620 is hereby incorporated herein by reference in its entirety. U.S. Pat. No. 6,391,620 describes a waste disposal unit that takes advantage of the migratory behavior of the BSF larvae, commonly know as "commercial unit."

Commercial Unit

In the commercial unit, the waste is laid out in long disposal areas called "tracks." A track could be several meters in width and several hundred meters in length. FIG. 3 is a diagram of a cross-section of disposal track, commonly know as a commercial unit, that is utilized in a bio-conversion facility for putrescent waste material is depicted in accordance with a preferred embodiment of the present invention. Waste material or more correctly, putrescent waste material and the bio-conversion living systems that feed on the putrescent waste material are confined in long disposal containers called "tracks" or "disposal tracks." Disposal track 300 encompasses a disposal volume, the cross-section of which is depicted by disposal area 302. Disposal area 302 is flanked by vertical curtain 310 which folds away from disposal area 302 forming ramp 304. Width w of disposal area 302 in disposal track 300 may vary from a few feet to approximately 20 feet and the overall width of disposal track 300 including ramps exceeds that. The length of a track may vary from a few feet to more than 1000 feet.

Flanking vertical curtains are further joined to front and rear sides (not shown), which delineate the disposal volume. Lateral support for the portion of vertical curtain 310 proximate the front and rear sides is provided by the sides, however, long runs of vertical curtain 310 require further support because the curtain lacks the structural integrity necessary to support large volumes of waste material. Therefore, in accordance with another preferred embodiment of the present invention, a series of lateral panels are positioned inside disposal track 300. Either end of every lateral panel 317 is connected to opposite vertical curtains flanking disposal area 302. Vertical curtains 310 are thus prevented from buckling outward under the stress of a heavy load of waste material. However, here again the force of the waste material on the lateral run of lateral panel 317 may introduce instability in lateral panel 317 so a series of longitudinal panels are interposed between the series of lateral panels. Longitudinal panel 319 runs parallel to vertical curtain 310 and may be connected to front and rear sides of disposal track 300. It is expected that both the lateral panels and longitudinal panels are securely fastened to one another, the vertical curtains and front and back sides by corrosion resistant fasteners or welding. Once secured, the sides, curtains and panels form a rigid, one-piece disposal track capable of withstanding the force exerted by the waste material and vibration resonance associated with excavating larval residue, is discussed in detail below.

Height h of disposal area 302 in disposal track 300 also varies depending on the feeding depth of the type of living system selected for the bio-conversion process and therefore, at a minimum height h must accommodate the living system. In accordance with a preferred embodiment of the present invention the minimum height h of disposal track 300 is equivalent to the combined feeding depth of the selected bio-conversion living system and the height of a larval residue excavation interval (the larval residue excavation interval will be discussed in detail below with respect to the scraper).

Ramp 304 extends approximately one foot at an uphill inclination of 15°–45°, however, these parameters are merely exemplary and may be modified depending on the lifecycle of the selected living system. Ramp 304 in the present example is intended for larvae-like organisms and may be omitted when disposal track 300 utilizes other living systems for bio-conversion. In the case of fly larvae, ramp 304 abuts collection tube 306. Collection tube 306 runs parallel and is attached to ramp 304 at longitudinal slit 307 which formed in the upper portion of collection tube 306. The slit is proximate to the upper extent of ramp 304. Downspout(s) 308 are positioned at predetermined intervals along collection tube 306 which are designed to act as a conduit to container 309 for trapping and holding the larvae. Container 309 is a convenient holding means temporary storage of live larvae prior to collection.

In accordance with a preferred embodiment of the present invention, vertical curtain 310 does not intersect the floor of disposal area 302; instead, residue excavation gap 312 is formed between the lower edge of vertical curtain 310 and the bottom of disposal area 302. The function of excavation gap 312 will be discussed in detail below. In further accordance with a preferred embodiment of the present invention, the floor of disposal track 300 is formed by under-pan 314, which is positioned beneath disposal area 302 of disposal track 300. Under-pan 314 may be supported by any expanse of ground or flooring having a level area capable of accommodating the area of under-pan 314. However, due to the need for residue excavation gap 312, under-pan 314 cannot support either vertical curtains 310 or the one-piece disposal track described above. Instead, vertical curtain 310 must be secured to pilings, or other similar support mechanisms (not shown), which are positioned outside the lateral extent of under-pan 314. Vertical curtains 310 or one-piece disposal track 300 may instead be suspended from an overhead framework. Whichever manner of support selected, residue excavation gap 312 must be maintained between vertical curtain 310 and under-pan 314.

Under-pan 314 supports the load created by putrescent waste and larval residue in the disposal area and provides a means for filtering water from the larval residue away from disposal area 302. In addition, under-pan 314 also serves to aerate the outgoing larval residue and elevates a scraper on a plane with gaps 312. This function will be discussed in greater detail below. In accordance with a preferred embodiment of the present invention, under-pan 314 is comprised of screen 316 supported longitudinally by prisms 318. Screen 316 may be composed of a plurality of layers of increasingly finer diameter filtration material. For example, an initial layer of screen 316 may be composed of a metal grid such as expanded metal commonly referred to as diamond mesh, which provides the necessary strength for supporting the waste in disposal area 302. In addition to the layer of expanded metal grid, screen 316 may comprise a second layer of finer diameter mesh applied over the metal grid. The diameter of the finer mesh determines the size of the particulate waste mater restricted from percolating into under-pan 314 with the filtrate. Depending on the strength and filtering properties of available meshes, screen 316 may be comprised of more than two mesh layers in order to accommodate the unique strength and filtration requirements for a particular bio-conversion application.

Screen 316 is supported by prisms 318 which are equally spaced along screen 316 by a predetermined amount and run lengthwise parallel to the length of disposal track 300. Note that the runoff of filtration fluids across prisms 318 will be channeled in troughs created by the space between adjacent prisms. Prisms 318 may be constructed from individual lengths of angle iron wherein each length of angle iron has the necessary dimensions to support screen 316 and the height adjacent the opening of gap 312. Of course, both screen 316 and prisms 318, as well as every other part of under-pan 314, must be either fabricated of corrosion-resistant materials or treated so as to resist the naturally corrosive properties of the putrescent waste and filtration fluids drained away by under-pan 314.

In accordance with other embodiments of the present invention, prisms 318 in under-pan 314 are replaced by a latticework of intersecting vertical partitions (not shown) which provide the necessary support for a scraper. However, because disposal track 300 may extend lengthwise for hundreds of feet, lengthwise runs of vertical partitions are intersected at right angles and run side-to-side for strength. Alternatively, this lattice of intersecting vertical partitions may instead be oriented at forty-five degree angles from vertical curtain 310. Any latticework structure must be provided with drainage or weep hole to allow runoff of filtration fluids to migrate toward a filtrate collection mechanism.

In operation, the waste is deposited onto the surface of the track where the larvae are actively feeding. On each side of the track there is a ramp 304, and the larvae, upon reaching maturity, crawl up ramp 304 and through longitudinal slit 307 in pipe 306 running alongside the track.

The commercial unit is ideal for handling specialized type of waste such as chicken waste. FIG. 2 depicts caged layers could be situated above disposal area 202 but alternatively could be suspended above a disposal track 300 as described in U.S. Pat. No. 6,391,620. As soon as the chicken waste is produced, falls directly into disposal area 302 of unit 300 to be consumed by the BSF larvae. With respect to chicken waste, BSF larvae remove 50% of the phosphorus, and they also effect a 75% reduction in the weight and volume of chicken waste. The greatly reduced chicken waste (dry, friable and odor-free) makes a wonderful organic fertilizer. The residue of the larvae is allowed to accumulate in the disposal track and is retained laterally by means of two curtains 310.

A larval evacuation pipe 306, ramp 304 and curtain 310 are suspended off floor and support screen 316. This leaves an opening of approximately 45 mm (1.77 in.) at the bottom of the curtain. The larval residue is easily scraped and extracted through this opening and deposited to one side of the disposal track. A small 150 mm (5.91 in.) wide conveyor belt, running parallel to the disposal track, completes the evacuation of the residue.

The extraction of the larval residue is accomplished by means of a scraper. The length of the scraper corresponds to the width of the waste disposal track. The scraper travels underneath the disposal area, moving from one longitudinal end of the disposal track to the other. When the level of larvae and fresh waste rises above the base of the ramp, the scraper is set in motion, extracting approximately 50 mm (1.97 in.) of larval residue. The concept is quite simple: waste is deposited on the surface of the disposal track, and larval residue is periodically removed from the bottom. The scraper is fabricated out of a chain fitted with blades. As the scraper advances underneath the track, the blades evacuate the larval residue at a 90-degree angle to the longitudinal axis of the track. The following drawing shows how the scraper is fabricated.

While various types of bio-conversion facilities for the treatment of putrescent waste are known in the prior art, each has several disadvantages making them unsuitable for some situations. For example, each of the above-described systems requires a fairly sophisticated implementations, including significant capital, specialized equipment and a relatively skilled personnel for operating the facility. Each of the facilities described above could be considered moderately mechanized and as such require a specific floor plan for efficient bio-conversion operations. Additionally, depending on the level of mechanization, the skill level of the labor force, as well as the initial capital expenditures both increase with the level of mechanization. Each of the above described have bio-conversion facilities also have the additional disadvantage of needing a rather large surface footprint for the amount of area actually devoted to the bio-conversion process. Thus, the prior art bio-conversion facilities generally do not make efficient use of land area. These shortcomings make prior art bio-conversion facilities generally unsuitable for location in confined spaces. Moreover, given their inefficient use of surface area and need for moderately skill operating personnel combined with their high initial capital costs, in many situations these facilities are unsuitable for many rural and underdeveloped regions.

SUMMARY OF THE INVENTION

The present invention is directed to an apparatus for efficiently bio-converting putrescent wastes to a more usable form and corresponding method for using the apparatus. The present "domestic" unit does not utilize a motor nor does in contain any moving parts. Instead, the present domestic generally comprises a generally rounded container with one or more ramps on the inside of the container. In the two-ramp embodiment, the two ramps begin at the bottom of the container and spiral up to the top of the container, where they adjoin a discharge pipe. In operation, the putrescent waste is deposited into the domestic unit container. Mature larvae have only one avenue of escape from the putrescent waste, up the ramps and into discharge pipe and onto collection tubes where the larvae are collected and processed. When the container fills up with larval residue, the larvae are removed from the container, the container is emptied of residue, and the larvae are put back into the container. Because the container may be fabricated in any size, from a wide variety of materials, smaller containers can be manually tended.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIGS. 9A and 9B are diagrams depicting multiple palletized domestic units coupled together to form a transfer station in accordance with an exemplary embodiment of the present invention.

Figure 1:
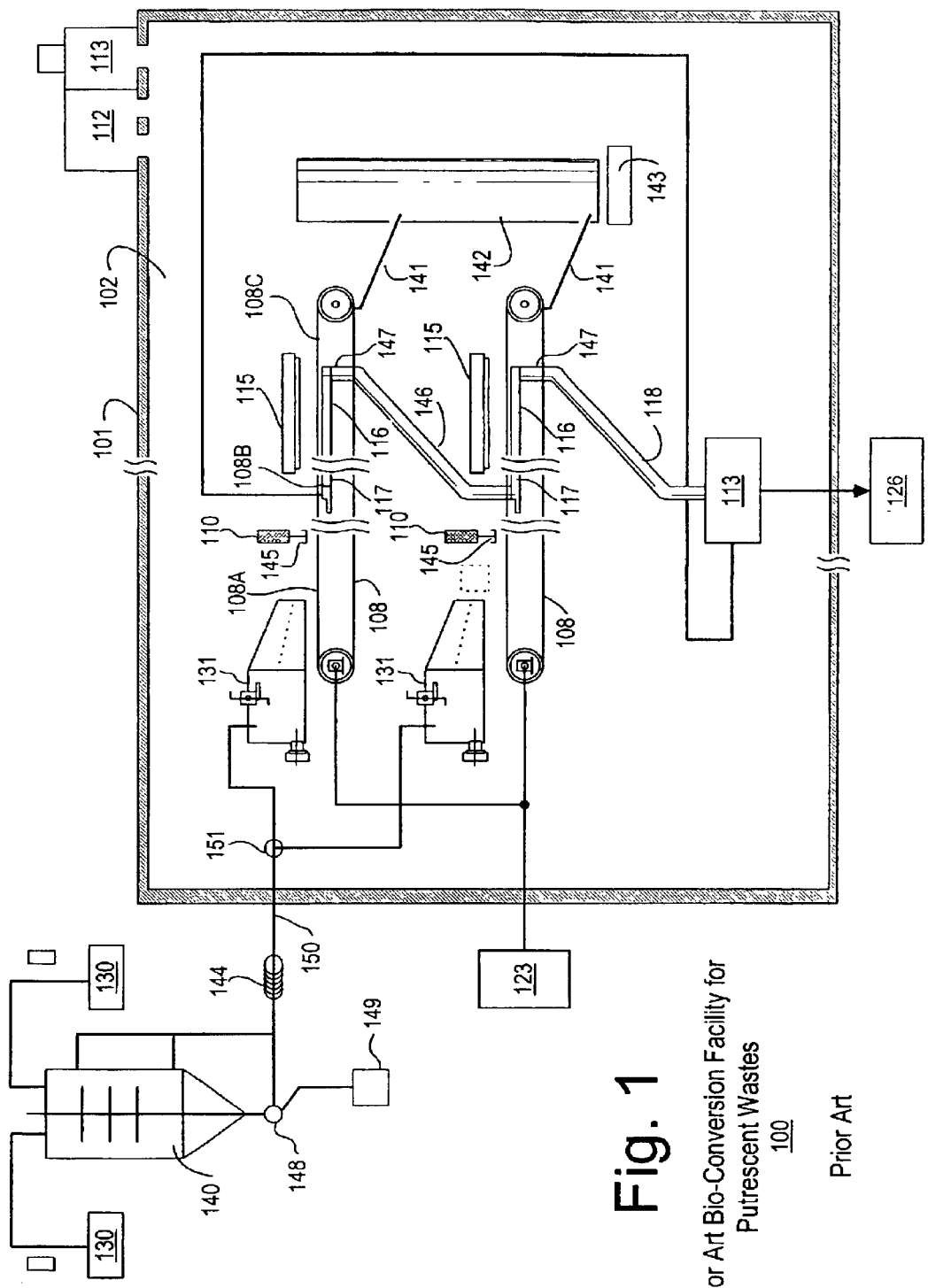
FIG. 1 is a flow diagram of a prior art bio-conversion facility for continuous treatment of putrescent waste by means of fly larvae in which the fly larvae actually eat the waste.
Figure 2:
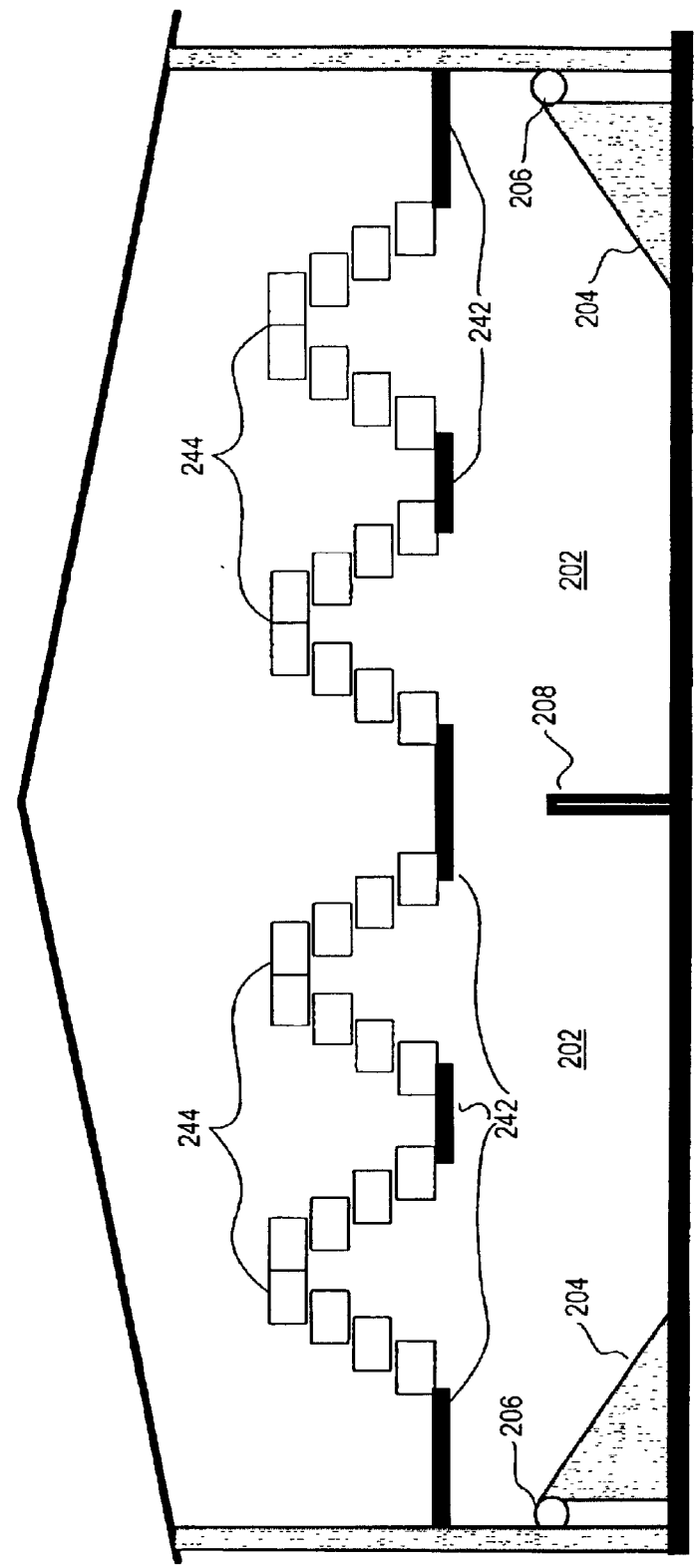
FIG. 2 is a cutaway diagram of another prior art bio-conversion facility for treatment of putrescent waste.
Figure 3:
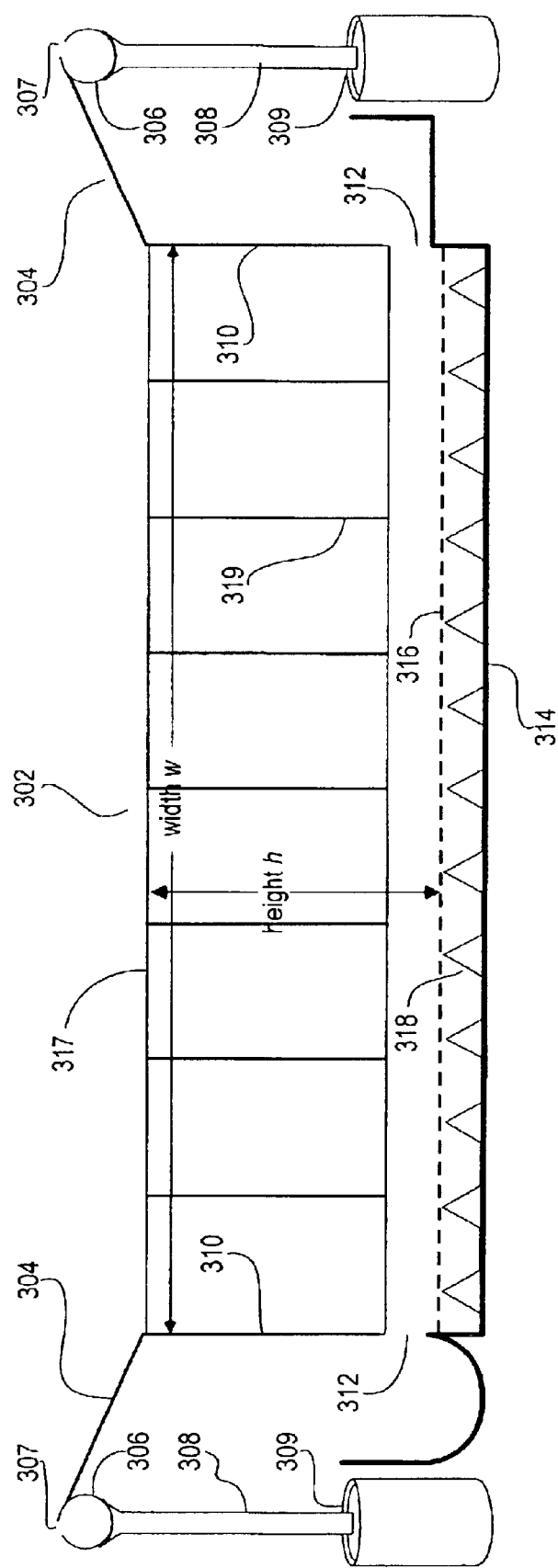
FIG. 3 is a diagram of a cross-section of prior art disposal track utilized in a bio-conversion facility for putrescent waste material.
Figure 4:
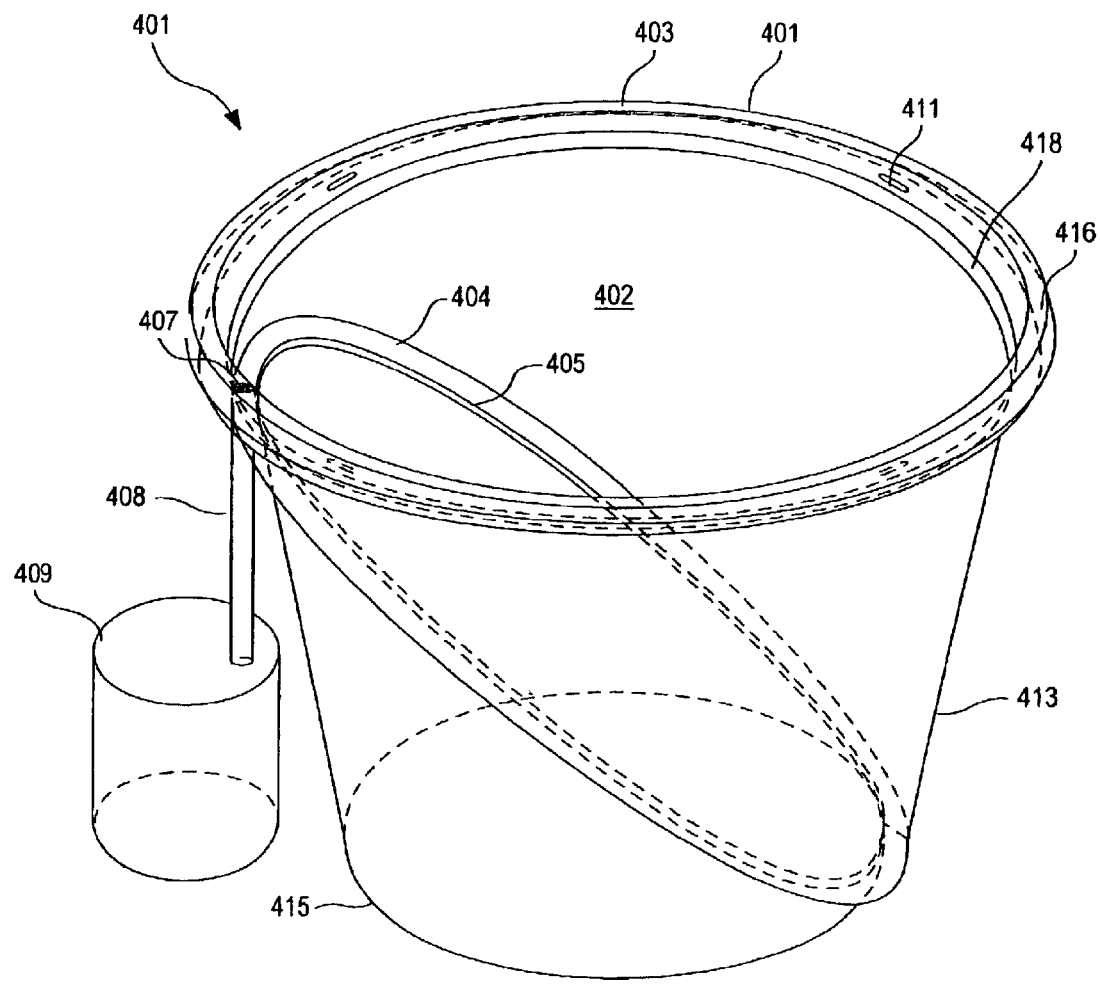
FIG. 4 is a diagram of a "domestic" unit for the efficiently bio-converting putrescent wastes to a more usable form in accordance with an exemplary embodiment of the present invention.

Other features of the present invention will be apparent from the accompanying drawings and from the following detailed description.

DETAILED DESCRIPTION OF THE INVENTION

The present invention is generally directed to apparatus and method for disposal of putrescent waste material, and in particular the continuous bio-conversion of putrescent waste material. The domestic unit has no motors and no moving parts. In accordance with one exemplary embodiment the domestic container generally comprises a generally rounded container with two small ramps on the inside of the container. The two ramps begin at the bottom of the container and spiral in opposite directions to the upper portion of the container, where they meet a discharge pipe. When the container fills up with larval residue, the larvae are removed from the container, the container is emptied of residue, and the larvae are put back into the container with "fresh" putrescent waste. While the subject method and apparatus are described with respect to using fly larvae as the bio-conversion living system, it should be understood that the inventive features of the present invention do not require use of fly larvae to the exclusion of any other living system.

With particular attention to FIGS. 4 and 5A–5F diagrams of a domestic unit for the efficiently bio-converting putrescent wastes to a more usable form are depicted. Reference characters in FIGS. 5A–5F are consistent with reference numbers in FIG. 4 identifying corresponding details. Unit 400 is illustrated as comprising a generally cylindrically shaped container, container 401 with sufficient open volume (disposal are 402) for holding quantities of putrescent wastes. As shown, outer walls 413 of container 401 may be oriented vertically, in a traditional cylindrical configuration (not shown), or alternatively may be slightly inclined from vertical as depicted. While unit 400 is depicted as being generally cylindrical in shape, container 401 may be configured in a variety of shapes, such as cubic, or even conic. More particularly with respect to FIG. 4, it should be noted that unit 400 has no motors and no moving parts. Thus, near continuous bio-conversion of putrescent waste material may be accomplished without the aid of sophisticated and sometimes troublesome machinery.

In accordance with an exemplary embodiment of the present invention, putrescent wastes may be deposited in disposal area 402 within container 401. Fly eggs may be introduced. As will be seen below, disposal area 402 contains a colony of fly larvae in different stages of development, from newly hatched larvae to mature larvae because new fly eggs are introduced to the waste as larvae leave the disposal area. The colony of fly larvae is replenished with fly eggs by either manually introducing the eggs into disposal area 402, or alternatively providing ingress to disposal area 402 for mature female adults. In the latter case, fly larvae are constantly replenished with fly eggs without the need for human intervention. As discussed above, fly larvae hatch from the eggs and whereby the fly larvae actually eat the waste material or bacteria which occurs on the waste. The fly larvae feed in the top few inches of waste, but interestingly a population of fly larvae will tend to self regulate its numbers in order to extract optimal nutrition from each layer of waste prior to reaching the maximum feeding depth of the fly larvae. When the fly larvae mature, the mature larvae surface from the putrescent waste in search of a more favorable environment to pupate. This fact allows the mature fly larvae to be totally self-harvesting and thus human intervention is keep to a minimum.

Harvesting occurs when the mature fly larvae attempt to exit the putrescent waste in disposal area 402. When fly larvae mature, the larvae feel the need to leave the putrescent waste and find a more accommodating environment for which to pupate. Fly larvae then empty their guts of waste and set out in search of an ideal pupation site. Certain species of larvae, such as the larvae of the BSF, will crawl over 320 ft. to find an ideal site. An ideal pupation site should be free of the enormous bacteriological activity which characterizes waste disposal area 402 of domestic disposal unit 400, be free of small predators such as mites and pseudo-scorpions, and be free as well of large predators such as birds, armadillos, opossums and raccoons. When larvae reach the radial edge of disposal area 402, normally they will come upon a portion of the vertical interior of container 401.

Figure 5A:
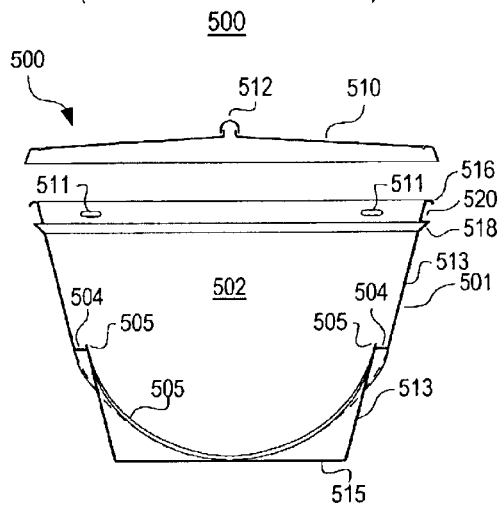
FIGS. 5A–5F are diagrams of domestic unit 500 being depicted in various perspectives in accordance with an exemplary embodiment of the present invention.
Figure 5B:
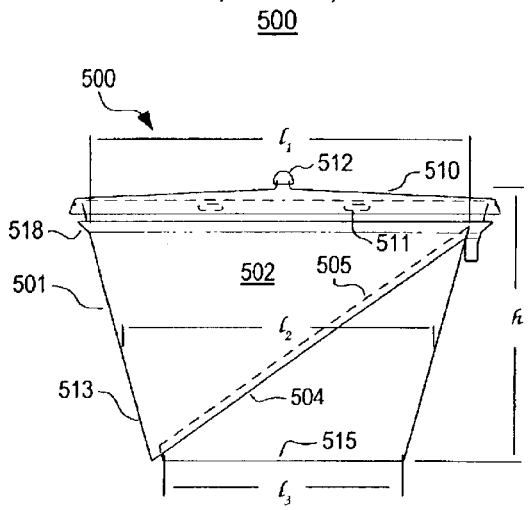
Figure 5C:
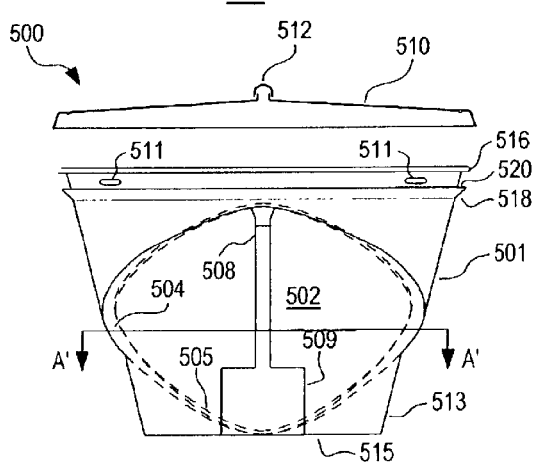
Figure 5D:
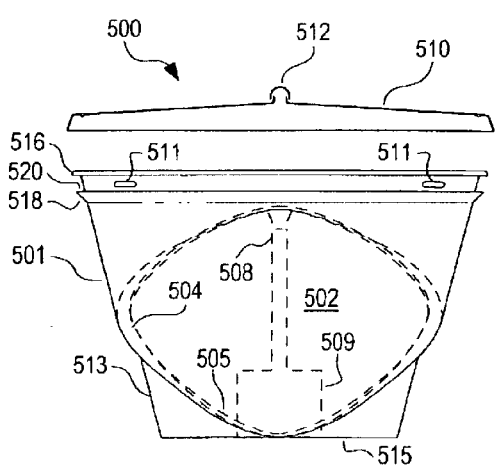
Figure 5E:
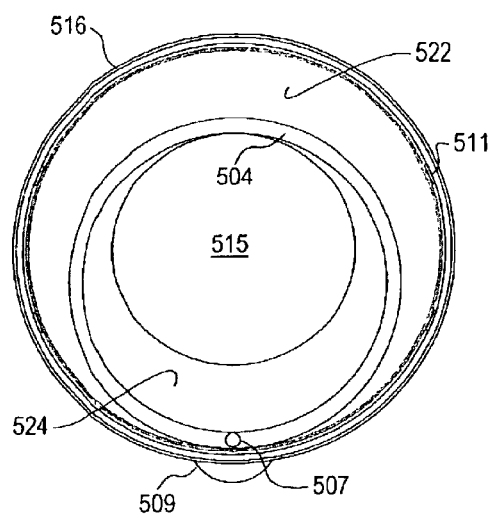
Figure 5F:
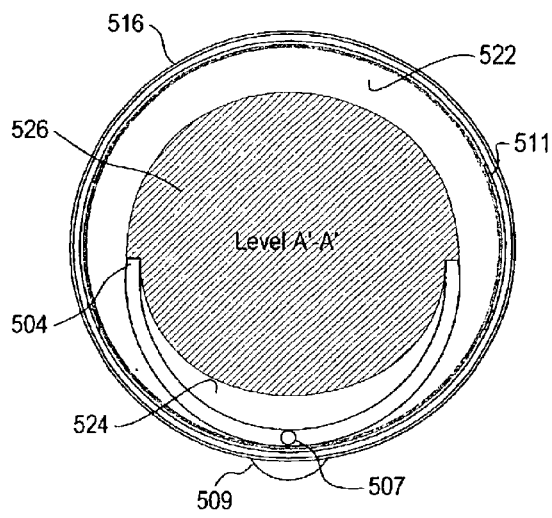

The vertical walls of container 401, as depicted, have a generally circular cross-sectional shape around disposal area 402 (see FIGS. 5E and 5F). Spiraled along the inside of container 401 are ramps 404. Unit 400 is depicted as having two ramps, although in accordance with various exemplary embodiments, unit 400 may have only one ramp or alternatively may have more that two (usually configured as opposing pairs of ramps). In the present embodiment, each of ramps 404 begin at or near the bottom surface 415 of container 401, proximate to one another, and spiral up side wall 413 in opposite directions toward the top of the container. Near the upper portion of container 401, ramps again unite at opening 407, however opening 407 substantially traverses the surface of ramps 404. Domestic unit 400 may be configured with ramps having any width, but need not be wider than about 25 mm (1 in.), moreover their size should be kept to a minimum because ramps 404 extend laterally into disposal area 402 and decrease the volume of waste it is potential capable of holding. Ramps 404 may be fabricated as separate structural elements that are fitted into container 401 during the assembly of container 401, or, alternative, may be constructed directly into side wall 413 as a fold. Folding ramps 404 into side wall 413 of container 401 reduces the likelihood that seams, cracks and other unconformities will result from fitting ramps 404 to the inner surfaces of side wall 413 (seams, cracks and other unconformities may impede the migration of the larvae and result in the premature pupation of larvae that cannot have not exited the container). When the ramp is created by means of a fold in the wall of the container, the underside of the ramp lies outside the disposal unit. In this way, migrating larvae cannot uselessly congregate underneath the ramp in their search for a way out of the disposal unit. Each ramp may be inwardly terminated with continues vertical rail 405 which prevents the migrating larvae from falling off of ramps 404 and back into the putrescent waste. Rail 405 may be a separate element fastened onto rail 404 or may instead be formed simultaneously with ramp 404 by folding side wall 413 as discussed above. Alternatively, ramps 404 may have a concave curvilinear cross-sectional shape, rather than being flat, thereby forcing the larvae away from the ramp edge and into the center path of ramps 404.

The particular features the domestic unit may be better understood with reference to the descriptions of FIGS. 5A–5F, especially with regard to the migration of larvae. FIG. 5A is a diagram of a cross-sectional view of domestic unit 500 from a frontal perspective, while FIGS. 5B–5D are diagrams of domestic unit 500 as seen from the side, front and rear, respectively. FIGS. 5E and 5F are diagrams of container 501 as viewed from above where FIG. 5E shows container 501 empty and FIG. 5E shows container 501 with putrescent waste filled to a height of A–A' as in disposal area 502 represented on FIG. 5C.

From FIG. 5E it is apparent that bottom surface 515 is in the approximate center of container 501 and when viewed from above appears to be surrounded by ramps 504, which actually spiral upward along walls 513 in opposite directions. Disposal area 502 is filled with waste in a generally even fashion as larvae digest the waste, as represented by surface 526 in FIG. 5F which depicts container 501 at an intermediate filled stage. As can be visualized from FIGS. 5A–5F, each of ramps 504 form connecting member between inner surface 522 and inner surface 524 as ramps 504 spiral up the inner wall of container 501. At each intermediate cross-sectional horizontal plane of container 501, ramps 504 appear as a straight line connecting inner surface 522 to inner surface 524 (although in the lower and upper cross-sectional horizontal planes of container 501 ramps 504 may appear slightly different). One difference between domestic unit 500 and commercial unit 300 is volume of the disposal area allocated for the ramps. Ramps 304 form a lateral side wall in commercial unit 300, while ramps 504 appear to spiral up the side wall of container 501. Clearly, ramps 504 displace far less volume than ramps 304 and therefore, generally, the ratio of the volume of ramps 504 to the volume of disposal area 504 is proportionally smaller than the ratio of the volume of ramps 304 to the volume of disposal area 304.

As can be understood with particular reference to FIGS. 5E and 5F, as the migrating larvae attempt to exist disposal area 502, they crawl along waste surface 526 until they are confronted with one of inner surfaces 522, 524 or ramps 504. Ramps 504 are interposed between inner surface 522 and inner surface 524. Inner surfaces 522 and 524 are vertical, or near vertical, so the only avenue of escape for the larvae is ramps 504. Since the presence of inner surfaces 522 and 524 present vertical impediments to the migrating larvae which are very difficult for the larva to traverse, they crawl along the inner surface in one of a generally clockwise or counterclockwise direction. The spiral configuration of ramps 504 does not inhibit the migration of the larvae because on any horizontal surface, such as waste surface 526, a migrating larvae is presented only with a vertical surface or a ramp. There are no corners, undersides, dead-ends, overhangs, or other traps in the interior of unit 501 to disorient or confuse the larvae and cause them to uselessly congregate in their search for a way out of the waste. If a larva is following inner surface 522 (either in a clockwise or counterclockwise direction) it will eventually cross a threshold of one of ramps 504 and continue up the incline between rail 505 and inner wall 522 unit it reaches the top. There, the migrating larvae-exhaust into a singe port, opening 507, located at the upper distil end of discharge pipe 508. Notice, however, if a larva follows inner surface 524 (either in a clockwise or counterclockwise direction) it cannot cross directly over the threshold onto one of ramps 504 without either reversing course, or following inner surface 524 to inner surface 522 and on to one of ramps 504 as described above. Thus, the design of container 501 conforms to the natural tendency of the larvae to migrate in a straight line. Although FIGs. 4 and 5A–5F depict container 501 as having two ramps, container 401 may be fitted with any number of ramps which may, or may not directionally oppose one another as depicted in the figures. Additional, container 501 may be serviced by one of more discharge pipes for harvesting larvae.

As the larvae exit disposal area 502 via ramps 504, the uphill inclination makes it difficult for the larvae to carry along any adhering residue. In the case of housefly larvae, it is necessary to moisten the surface of ramp 504 so as to provide traction. This is not necessary for soldier fly larvae. Once at the upper extent of ramp 504, the larvae will drop into discharge pipe 508 through opening 507 and, in accordance with an exemplary single unit embodiment, directly into larvae container 509.

Occasionally, especially when the surface of the container is wet and moist, a lava will attempt to traverse the near vertical extent of inner surface 522 and escape over the container over it's upper edge. The larvae are prevented from exiting container 510, other than through opening 507, by various geometric shapes formed in side wall 513 of container 501 which the larvae cannot navigate. One such shape is formed in the upper edge of side wall 513 by turning the upper edge inward, or inward and downward (not shown). The inward formed beveled lip prevents the larvae from exiting container 501 between beveled lip 516 and the lid 510. Larvae attempting to crawl over the inward formed beveled lip drop off of the lip onto ramps 504 or into disposal area 502 due to the acute angle of the beveled lip. Alternatively, larvae may also be prevented from exiting the domestic unit, other than by means of ramps 504, by forming beveled side 518 in outer wall 513 of container 501 in a position higher than the maximum height of ramps 504, a profile of which is shown in FIGS. 5A–5D. The cross-sectional shape of beveled side 518 is shown in FIG. 5A. Beveled side 518 protrudes outwardly and upwardly from side wall 513 around the circumference of container 502. At the furthermost outward extent of beveled side 518 it turns back on itself forming a near-horizontal plane of roof 520. The transition from the outward and upward side bevel to the horizontal roof is impossible for most crawling creatures to navigate, thus forcing them to exit container 501 using ramps 504 into a discharge opening 507.

When container 501 fills up with larval residue, the larvae are removed from the container, the container is emptied of residue, and the larvae are put back into the container. Because the container may be fabricated in any size, from a wide variety of materials, smaller containers can be manually tended. For example, a small 60 cm (diameter)×60 cm (height) container fabricated from durable plastic. How often should a 60×60 cm unit be cleaned out? If the reduction in the volume of food waste is on the order of 86%, then a 60×60 cm unit would have to be cleaned out every 285 days. Such units are small so that they can be easily lifted and cleaned out.

Domestic unit 500 is equipped with lid 510 so that it remains dark within the unit. In that way, the larvae will actively feed on the surface throughout the day and night. Lid 510 is also designed to protect unit 500 from rain when domestic unit 500 is used out of cover. Lid 510 is optional in certain situations where domestic unit 500 is used within a closed environment Such as in certain transfer stations. Alternatively, lid 510 may be replaced with a seat in applications where domestic container 501 is used as a toilet for processing human waste using larvae (the toilet embodiment is discussed below along with pertinent test data). Lid 510 may optionally be configured with handle 512 for easy removal for adding putrescent waste material or extracting larval residue and may further be vented for additional aeration. Handle 512 may also be detachable, thereby exposing the vent which may be used as an input opening for adding putrescent by means of a automated auger system as shown in FIGS. 9 and 10.

In accordance with some exemplary embodiments, a crack is formed between lid 510 and beveled lip 516. The crack provides an opening for allowing the adult females access to disposal area 502 to lay eggs. Alternatively, container 501 may be fitted with small openings 511 for admitting adult flies for egg laying. Of course, openings 511 should be positioned above both ramp 504 and beveled side 518 to ensure that larvae cannot crawl out of openings 511 while simultaneously providing adult flies with easy access to the sides of the container for egg laying. Additionally, domestic unit 500 may be mounted on four small legs (not shown), each in a cup of water so as to prevent ants from entering the unit. The unit is also designed to prevent the entry of rodents and other larger predators.

The design of domestic unit 500 may be fabricated to virtually any dimensions but in accordance with one exemplary embodiment the dimensions of domestic unit 500 are such that the units may be manually tended, i e. units full of larval residue can be emptied without the aid of mobility machinery. The dimensions for an exemplary domestic unit 500 intended for manual tending are $l_1$=60 cm (23.6 in.), $l_2$=778 cm (30.6 in.), $l_3$=947 (37.3 in.), and h=60 cm (23.6 in.). A small 60 cm (23.6 in.) diameter×60 cm (23.6 in.) height container in plastic is ideal for the disposal of food waste for underdeveloped areas with high population densities.

Alternative, if a modest level of mechanization is available (e.g. forklift or other lifting equipment), then the units may be palletized and moved on the pallet via a forklift. The dimensions for an exemplary domestic unit 500 intended for pallitization are $l_1$=90 cm (35.4 in.), $l_2$=1177 cm (46.3 in.), $l_3$=1406 (55.4 in.), and h=90 cm (35.4 in.). It should also be recognized that higher height to length ratios will result in steeper angles on ramp 504 and therefore the desired angle of the ramps should be carefully considered while selecting container dimensions.

Figure 6:
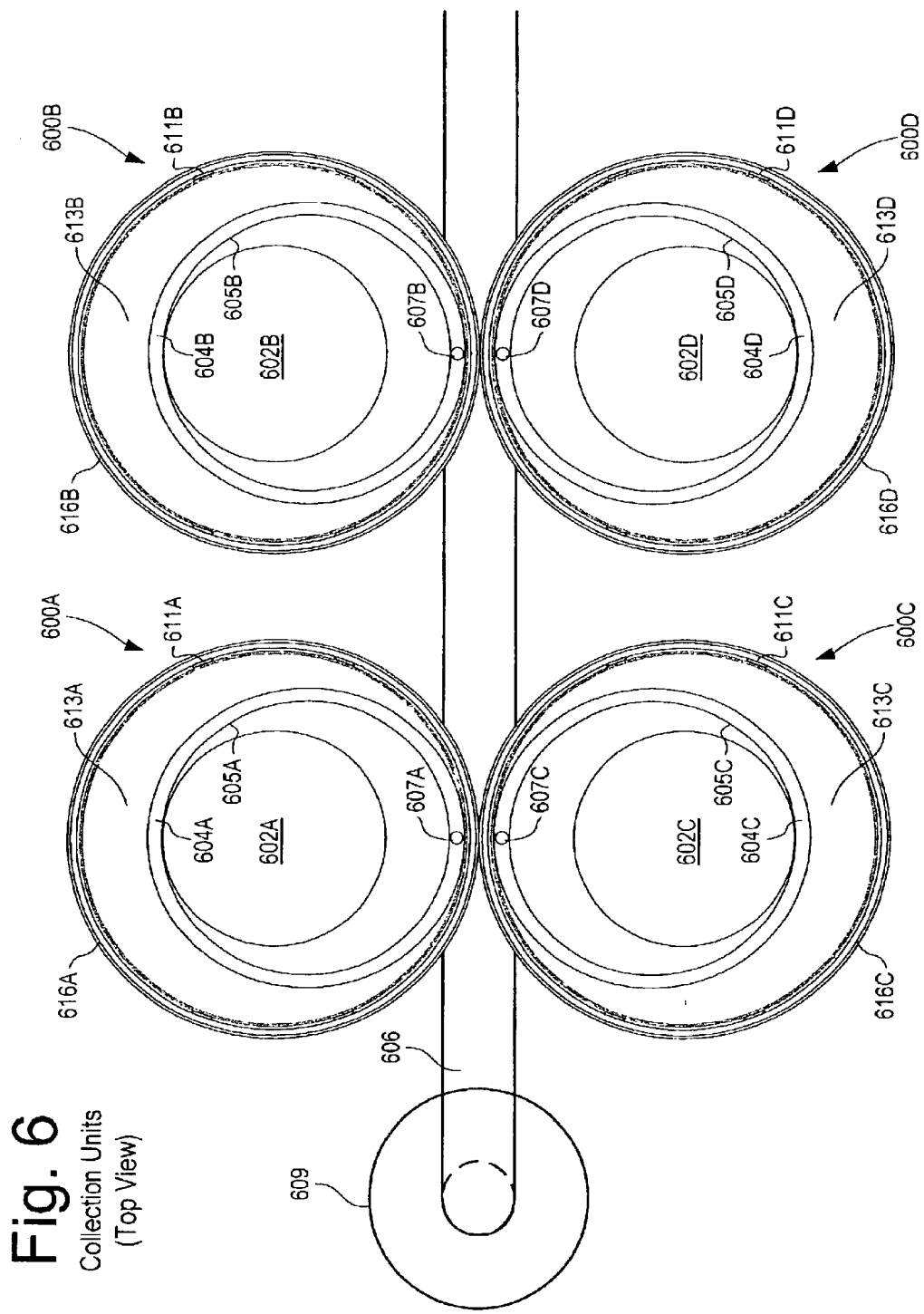
FIG. 6 is a diagram depicting multiple domestic units 600 connected to a common discharge pipe 606.
Figure 7:
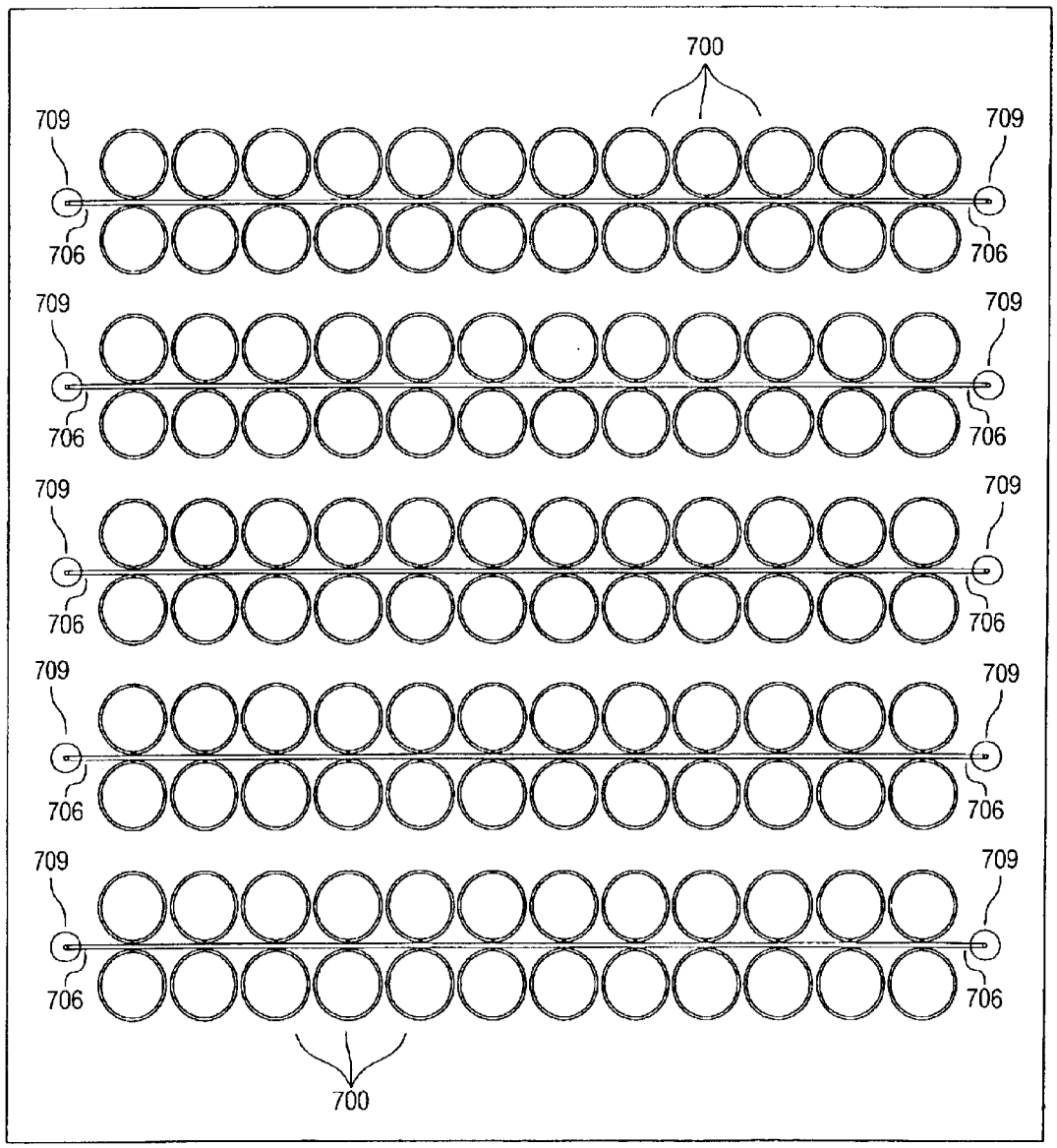
FIG. 7 is a diagram depicting multiple domestic units coupled together to form a transfer station in accordance with an exemplary embodiment of the present invention.
Figure 8:
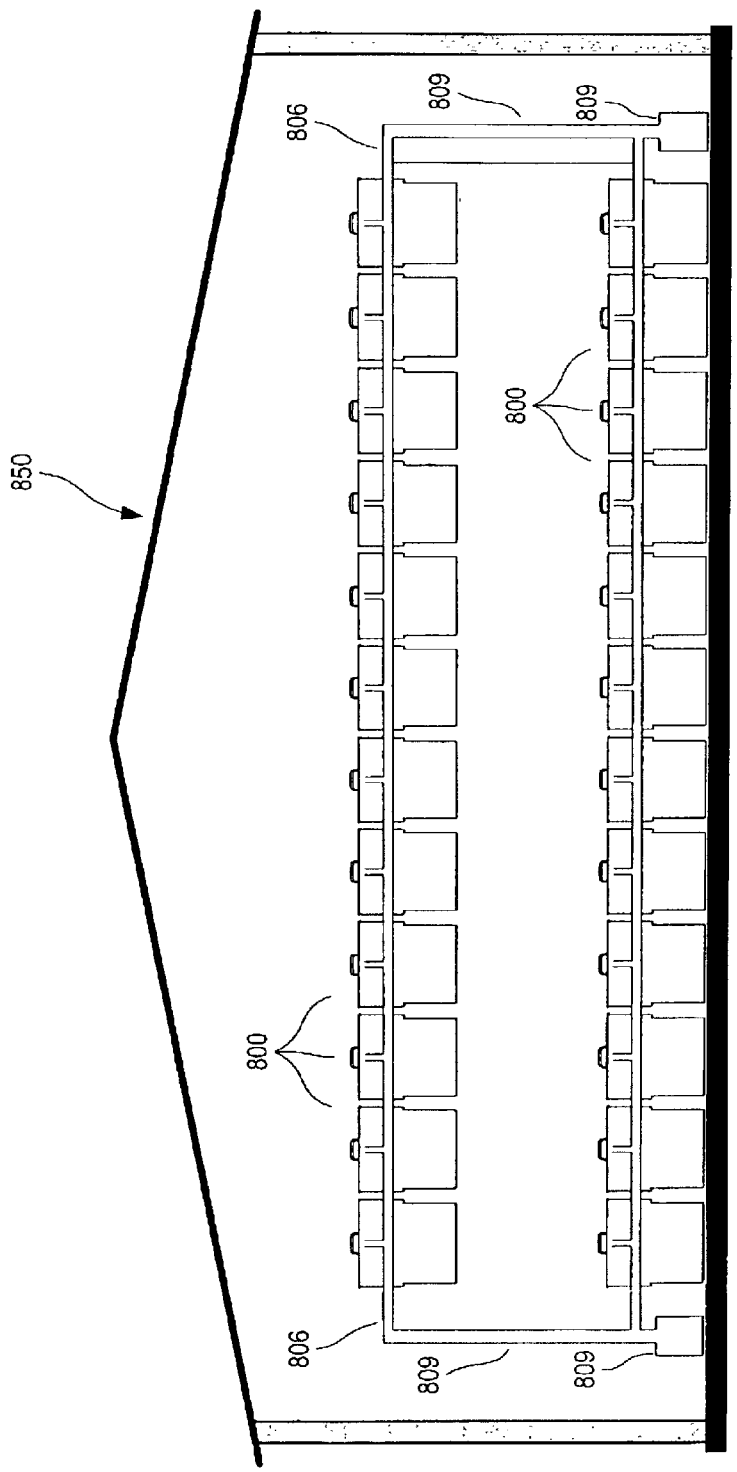
FIG. 8 is a cross-sectional diagram depicting multiple domestic units coupled together to form a transfer station in accordance with an exemplary embodiment of the present invention.

Each domestic unit 500 may be coupled to a corresponding larvae container 509 via discharge pipe 508 or in accordance with other exemplary embodiments, multiple domestic units 500 may be coupled to a single discharge pipe. FIG. 6 is a diagram depicting multiple domestic units 600 connected to a common discharge pipe 606 in accordance with an exemplary embodiment of the present invention. Notice that domestic units 600A–D are each proximate to common discharge pipe 606 that leads to larvae container 609. In this way, multiple units may be coupled and the larvae produced from each are harvested at a central location, i.e. larvae container 609. FIGS. 7 and 8 are diagrams depicting multiple domestic units coupled together to form a transfer station. Notice that domestic units 700 may be connected to either side of discharge pipe 706, forming long, parallel rows of domestic units. FIG. 8 depicts a cross-sectional view of transfer station 850 showing that the rows of domestic units 800 may further be layered, one row over another, thereby increasing the active surface area for larvae to feed. Moreover, transfer station 850 is extremely efficient as the amount of surface area of putrescent waste for larvae to feed may actual exceed the footprint of transfer station 850 itself. As depicted in FIGS. 7 and 8, the putrescent waste is added to the domestic units manually. FIGS. 9A and 9B depict the side and front views of transfer station 950 for the automated filling of containers 901 with waste material using screw or chain conveyors 940 in accordance with another exemplary embodiment of the present invention. Transfer station 950 may be located proximate to a facility known to generate vast amounts of waste material such as a swine factory farm where the swine waste is collected at the farm and conveyed to the transfer station and then on to containers 901 by screw or chain conveyor 940. Notice that each container unit 901 rests on pallet 930. Pallets 930 provide a lift structure for a forklift of other lifting means for removal and emptying of larval residue. Thus, because a forklift is used for moving units 501, their dimensions can be substantially increased over manually tending units.

Figure 10A:
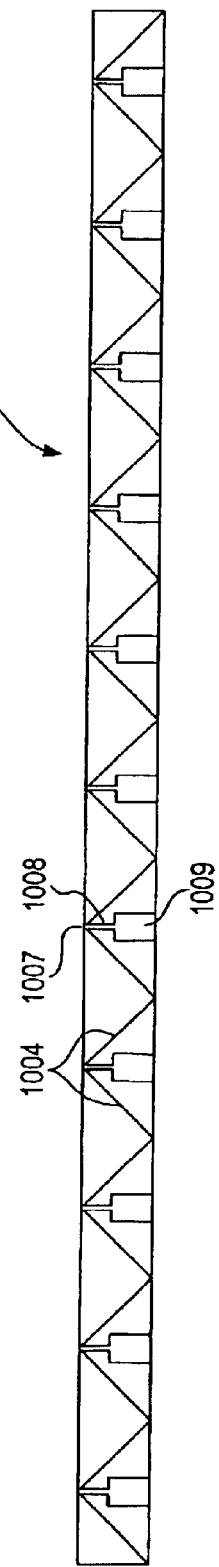
FIGS. 10A and 10B are diagrams depicting a transfer station having multiple levels of disposal container each having side ramps in accordance with an exemplary embodiment of the present invention.
Figure 10B:
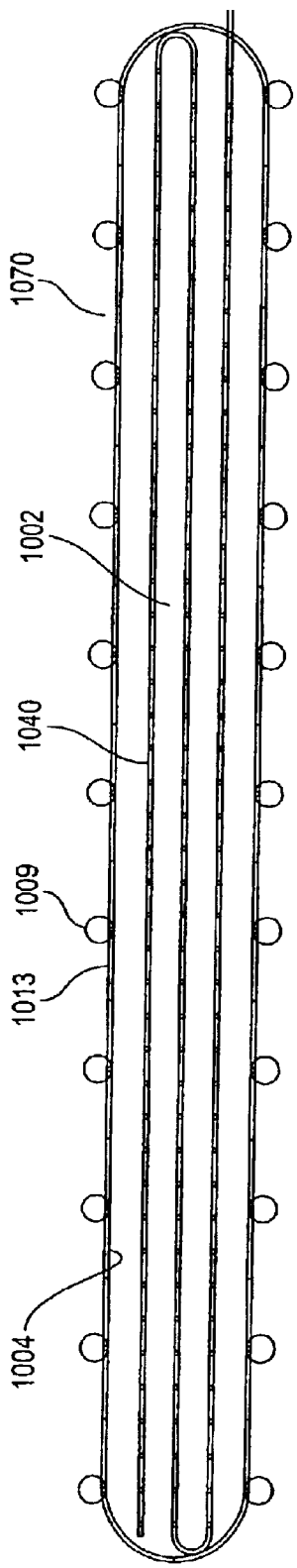

FIGS. 10A and 10B depict the side and top views of a single level 1060 of a transfer station in accordance with another exemplary embodiment of the present invention. Rather than positioning a plurality of domestic units on each level as in the previously discussed embodiment, only one elongated unit 1070 occupies each level. Ramps 1004 are similar to those described above associated with the domestic unit but elongated unit 1070 requires a plurality of ramps along the outer walls. Notice from FIG. 10A that ramps 1004 a "V" is formed at the bottom of elongated container 1001 by the joining of ramps 1004. Similarly, an inverted "V" is formed where the upper end of ramps 1004 meet at openings 1007, which is connected to discharge pipes 1008. It is expected that elongated 1070 would be filled using automated screw or chain conveyors 1040. Depending to the dimensions of elongated unit 1070, automated screw or chain conveyors 1040 may be laid over the unit in a serpentine pattern to for evenly distributing the waste across the entire surface of disposal area 1002.

Transfer Station

It would cost approximately $10.18 U.S. dollars to fabricate a 60×60 cm domestic unit by means of plastic injection molding. With 236 such units per transfer station, the cost to equip a transfer station would be about $2,400. With 3,000 transfer stations in Ho Chi Minh (HCM) City, the cost to equip the entire city would be about $7,200,000. How often should a 60×60 cm (23.6×26.6 in.) unit be cleaned out? If the reduction in the volume of food waste is on the order of 86%, then a 60×60 cm unit would have to be cleaned out every 285 days. The units are small so that they can be easily lifted and cleaned out.

If situated at the level of the transfer station, the food waste would have to be transported only from its point of origin to the transfer station. Such a short distance could be handled by very small motorized or even non-motorized vehicles. Flow then to persuade the person who generates the food waste to keep it source-separated? The only way to assure that the general population of HCM City would keep its food source-separated is to attach a significant value to the food waste. If the larvae have value, then the food waste will have a value, and if the food waste has a value, then the person who generates the food waste should be paid for making it available for this larval bio-conversion process.

New Markets

The cultivation of bullfrogs under confined conditions is severely constrained by the availability, suitability and price of living food. The BSF larvae are easily washed, greatly reducing the risk associated with the transmission of disease. The epidermis of the BSF larvae is much tougher than that of other species of larvae used as bullfrog feed. This again reduces the risk of disease. The first feeding trial of fresh BSF larvae to young bullfrogs was conducted on Jun. 5, 2001 by Dozier Lester of Duson, La., USA. His newly metamorphosed bullfrogs had no problem ingesting mature prepupational BSF larvae. Since feeding live BSF larvae to his bullfrogs, Lester has noted a dramatic increase in their mortality rate. Why should Vietnam not raise bullfrogs?

The cultivation of bass is also an industry constrained by the availability of living food. Minnows at over $6/kg are typically used as living food in this regard. Eventually, fingerlings can be taught to cat pellets, but at a considerable expense. Freeze-dried crill at $34/kg are used to make the transition from living to non-living food. It takes 5 kg of live forage to produce 1 kg of full-body bass. The same logic could be applied to the cultivation of black and white crappie, perhaps one of the finest tasting freshwater fish. Live BSF larvae have been successfully fed to bass, crappie, tropical fish and reptiles. No doubt, there are many other markets that demand living food.

Human Waste

Thomas Crapper's invention of the water closet is viewed by many as "one of the stupidest technologies of all times." It mixes pathogen-bearing feces with relatively clean urine, it dilutes this mess with about 100 times its volume in pure drinking water, to which is added storm water full of heavy metals and other industrial toxins. It turns what could be an excellent organic fertilizer into a "serious, far-reaching, and dispersed disposal problem." With the help of the BSF larvae, all of this stupidity can be easily reversed. More than 60% of the streets in Vietnam do not have sewage lines. But why should Vietnam install the conventional sewage drainage system and sewage treatment plant? Both are very expensive and totally unnecessary within a tropical climate where the black soldier fly is active throughout the year. Therefore, the concept of a BSF toilet merits careful consideration. The BSF toilet would be fully enclosed, thereby eliminating all the problems associated with the rat infestation of sewage lines. The BSF toilet would be situated above ground, thereby eliminating the problems associated with the flooding of sewage lines during rainy season. Since human waste is digested by the larvae as soon as it is produced, there would be very little smell associated with the BSF toilet. More expensive versions of the BSF toilet might include a fan that is activated the moment the air-tight lid is raised. The toilet would no longer be seen solely as a means to dispose of human waste.

It would be seen primarily as a means of generating larvae and larval residue.

Small, independent companies might compete with one another in installing the servicing BSF toilets, sometimes free of charge, as a means of getting access to human waste and ultimately to the larvae and residue generated from this waste. Since human beings have very inefficient digestive systems, one could expect conversion rates of fresh human waste into fresh larvae as high as 20%. Waste paper and food waste could be added to the BSF toilet, thereby reducing the cost of transporting these materials to the transfer station.

The Solidification of Pig and Human Waste

As discussed above, the larvae of the black soldier fly (BSF) can be used very effectively to dispose of many types of putrescent solid waste. But their effectiveness in disposing of waste is severely constrained by the presence of free liquids. Free liquids relegate the larvae to feeding only on the surface of the waste, leaving everything else below to stew in an odiferous soup of anaerobic processes. The solidification of waste prior to its introduction into a larval disposal unit greatly enhances the ability of the larvae to access and digest it.

At times the solidification of waste may represent nothing more than the mixing of a wet waste with a dry waste. But most often it represents either draining away free liquids or adding some water-absorbent material. If we choose the former, we must find a suitable means to dispose of the free liquids, whereas if we choose the latter, we are adding to the weight and volume of larval residue.

Pig waste presents us with a special challenge. Here we are not only faced with liquids that block larval access to the solids, but we are faced with a fecal microbe, *Micrococcus urea*, that converts urinary urea into ammonia. This bacterium is found only in the feces, and it produces the enzyme urease that breaks down urea into ammonia and carbon dioxide. We may try to control the production of ammonia by manipulating the diet of the pig or by controlling the temperature and pH of its waste, but one of the cheapest and most effective ways of blocking the formation of ammonia is to keep the urine and feces apart. They come out pigs separately, and we should make every effort to keep them that way.

Pigs can be easily encouraged to defecate and urinate in well-specified places (see "Waste Management Swine Finishing Units, Leibbrandt, V. D., circular, University of Wisconsin (1981). They prefer to sleep and eat in warm-dry areas of the pen and to defecate and urinate in cold-wet areas of the pen. Also, defecation and urination tend to occur where pigs are allowed to have nose contact with pigs from other pens. If the warm-dry sections of pig pens are separated by solid walls, and if the cold-wet sections are separated by wire fencing that permits nose contact, then the pigs can be further induced to defecate and urinate only in the cold-wet sections of their pens.

Since the release of ammonia increases with an increase in the surface area covered by waste, the training of pigs to defecate and urinate within a limited area is an important factor in blocking the formation of ammonia. Furthermore, limiting waste to relatively small areas limits the size and expense of whatever apparatus is used to keep feces and urine apart. But how can we prevent their mixing?

One of the easiest ways to do this is by means of a laterally inclined conveyor belt positioned underneath the grated floor of the cold-wet section of the pig pen (see "Evaluation Of A Conveyor Belt Waste Collection System For Swine: Fecal Drying Efficiency And Ammonia Emission Reductions," Kaspers et al, Annual Swine Report, North Caroline State University, (2002) and "'Re-Cycle'": An Environmentally Sound System For Hog Waste Management," Koger et al, Annual Swine Report, North Caroline State University, (2002) describing important research done by Dr. Theo van Kempen in this regard. The urine rolls off one lateral side of the conveyor belt, while the far more viscous feces clings to the conveyor belt. A series of gutters and pipes route the urine to closed containers, while the feces is removed from the belt by means of a conventional belt scrapper.

Due to the rapid separation of urine from feces on the conveyor belt, bacterial urease has little opportunity to metabolize urinary urea into ammonia and carbon dioxide. Consequently, odor and ammonia emissions from the urine are reduced by as much as 80%. The dry matter content of the feces on a conveyor belt can easily rise from 30% (fresh from the pig) to as high as 70%. The dry matter content of the feces is regulated by setting the belt in motion at the most favorable time. Obviously the highest dry matter content of the feces within a 24-hour period is obtained in the early morning right before the pigs wake up. We may suppose that pigs do not urinate very much while sleeping, and this leaves ample time for the feces to solidify on the belt during the night.

Since about 70% of excreted nitrogen is in the urine, since the urine is immediately routed to a closed container cut off from atmospheric contact, and since fecal nitrogen is relatively slow at breaking down, this conveyor belt separation technique dramatically reduces the overall release of ammonia within the pig pen.

BSF larvae can easily digest fresh fecal matter of a 30% dry matter content. In this way, all of the nutrients and energy within the solid waste can be recycled by the larvae long before they have had a chance to decompose. Since the one conveyor belt not only separates urine from feces but also transports the feces away from the pig pen, it makes little sense to cultivate pigs and larvae within the same facility. The pig thrives best in a piggery free of waste, and the black soldier fly thrives best in a facility specially designed to enhance mating, egg production, egg laying and larval growth.

The principle drawback in placing the BSF larval disposal unit directly underneath the grated floor of the cold-wet section of the pig pen is easy to understand. The only way larvae could survive in such a watery environment would be to drain away excess liquids from the larval disposal unit. This leaves an aerated bed of larval residue through which all fresh urine must flow. Since the larvae cannot digest the large amounts of urea contained within the urine, since this mix of urine and feces is far too rich in nitrogen, the larval disposal unit becomes a huge generator of ammonia. Instead of capturing the urea contained within the urine, we lose it to fecal microbes, and in the end, we are left with a nitrogen-depleted effluent of little or no value. One might even argue that the in situ disposal of commingled pig waste by BSF larvae creates far more problems than it solves.

A single conveyor belt may pass under the cold-wet section of any number of contiguous rectangular pig pens, and the solidified feces may be scrapped off the conveyor belt and routed to any number of larval units by means a chain conveyor. The chain conveyor represents a simple and inexpensive way to positively displace solids and dispense them over a broad area. The chain conveyor discharges into an array of small receptacles, and once these receptacles are filled, the bottoms drop out of these receptacles, and the process repeats itself. In this way, an exact amount of fecal matter is presented to the larvae within units of time and surface area that are most conducive to larval growth.

We see, therefore, that BSF larvae are marvelously equipped to extract and recycle nutrients from pig feces, but they are ill-equipped to extract and recycle nutrients from pig urine. The conveyor belt represents one of the simplest means to solidify pig waste for larval digestion, while allowing urine to be quickly routed to closed containers for further processing and disposal. Many promising technologies are being developed to extract urea from urine. Crystalline hydrated aluminosilicates (zeolites) could be used to filter urinary nutrients, and afterwards the spent filtrate could be mixed with larval residue to form a marvelous organic fertilizer. Dr. Theo van Kempen has worked with an ion exchange process that removes 99.7% ammonia from the urine.

Humans resemble pigs in many respects. Both produce copious amounts of urine and relatively small amounts of feces. Therefore it should come as no surprise that the logic outlined above for pigs, of keeping urine separate from feces, has already been applied in several countries to the disposal of human waste. Many Swedish toilets, for example, feature a two-compartment bowl to separate urine from feces. The urine is stored in small tanks, located outside or below the house or building. This urine is later collected and sold as a valuable fertilizer, while the feces is composted within a chamber located underneath the toilet seat. BSF larvae could be introduced to these urine-diverting toilets, greatly accelerating the composting process and thereby reducing odor.

For similar reasons, we also find waterless urinals that make use of liquid-repellent coatings and lighter-than-urine trap liquids to minimize odor and ammonia emissions. Perhaps some of these sophisticated materials could be used in the design of the drainage system used to route pig urine away from the conveyor belt separator described above.

In any case, whether we are dealing with human waste or pig waste, hopefully two things are clear: we should not use water to evacuate waste, and we should not allow feces and urine to commingle. The larvae will love it and so will the pigs. Getting humans to cooperate will be far more difficult.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A domestic bio-conversion unit for facilitating bio-conversion of waste material comprising:

a container, said container having at least one wall with an outer surface and an inner surface, said inner surface at least partially forming an open volume for accepting waste material for bio-conversion; and a ramp, said ramp having a first lateral end and a second lateral end, said first lateral end adjoining the inner surface of said at least one wall and continuing along a contour of the inner surface of said container in an incline, and second lateral end extending laterally into the open volume.

2. The domestic bio-conversion unit recited in claim 1 above, wherein a cross-sectional shape of said inner surface is substantially curvilinear.

3. The domestic bio-conversion unit recited in claim 1 above, wherein a cross-sectional shape of said inner surface is substantially curvilinear and a cross-sectional shape of said ramp is substantially linear.

4. The domestic bio-conversion unit recited in claim 1 above, wherein said ramp follows the contour of the inner surface at a constant inclination.

5. The domestic bio-conversion unit recited in claim 1 above, wherein at least a portion of a cross-sectional shape of said container is curvilinear.

6. The domestic bio-conversion unit recited in claim 1 above further comprises:

a second ramp, said second ramp adjoining the inner surface of said at least one wall and following a contour of the inner surface of said container.

7. A domestic bio-conversion unit for facilitating bio-conversion of waste material comprising:

a container, said container having at least one wall with an outer surface and an inner surface, said inner surface at least partially forming an open volume for accepting waste material for bio-conversion;

a ramp, said ramp adjoining the inner surface of said at least one wall and continuing along a contour of the inner surface of said container in an incline; and a port opening, said port opening adjoining a portion of the ramp.

8. The domestic bio-conversion unit recited in claim 7, wherein said at least one wall being formed in a geometric shape for inhibiting travel of a crawling creature.

9. The domestic bio-conversion unit recited in claim 7 above further comprises:

a lid.

10. A domestic bio-conversion unit for facilitating bio-conversion of waste material comprising:

a container, said container having at least one wall with an outer surface and an inner surface, said inner surface at least partially forming an open volume for accepting waste material for bio-conversion;

a ramp, said ramp adjoining the inner surface of said at least one wall and continuing along a contour of the inner surface of said container in an incline, and a rail, said rail adjoining said ramp and continuing along said ramp in an inclined direction.

11. A domestic bio-conversion unit for facilitating bio-conversion of waste material comprising:

a container, said container having at least one wall with an outer surface and an inner surface, said inner surface at least partially forming an open volume for accepting waste material for bio-conversion;

a ramp, said ramp adjoining the inner surface of said at least one wall and continuing alone a contour of the inner surface of said container in an incline, wherein said ramp is formed by a fold in said at least one wall.

12. The domestic bio-conversion unit recited in claim 1, wherein said ramp is formed by a fold in said at least one wall.

13. The domestic bio-conversion unit recited in claim 7, wherein said ramp is formed by a fold in said at least one wall.

14. A domestic bio-conversion unit for facilitating bio-conversion of waste material comprising:
- a container, said container having at least one wall with an outer surface and an inner surface, said inner surface at least partially forming an open volume for accepting waste material for bio-conversion;
- a ramp, said ramp adjoining the inner surface of said at least one wall and continuing along a contour of the inner surface of said container in an incline; and
- an upper seat, wherein said domestic bio-conversion is used as a toilet for directly processing human waste using larvae.

15. A domestic bio-conversion unit for facilitating bio-conversion of waste material comprising:
- a container, said container having at least one wall with an outer surface and an inner surface, said inner surface at least partially forming an open volume for accepting waste material for bio-conversion, wherein a cross-sectional shape of said inner surface is substantially curvilinear and a cross-sectional shape of said ramp is curvilinear;
- a ramp, said ramp adjoining the inner surface of said at least one wall and continuing along a contour of the inner surface of said container in an incline.

16. The domestic bio-conversion unit recited in claim 1 above further comprises:
- an upper seat, wherein said domestic bio-conversion is used as a toilet for directly processing human waste using larvae.

17. A domestic bio-conversion unit for facilitating bio-conversion of waste material comprising:
- a container, said container having at least one wall with an outer surface and an inner surface, said inner surface at least partially forming an open volume for accepting waste material for bio-conversion;
- a plurality of ramps; and
- a plurality of port openings, each of said plurality of port openings adjoining a portion of at least one of the plurality of ramps.

18. The domestic bio-conversion unit recited in claim 17 above further comprises:
- an input opening for accepting the automated dispensing of waste material.

19. A domestic bio-conversion system for facilitating bio-conversion of waste material comprising:
- a plurality of bio-conversion units, each of said plurality of bio-conversion units comprising:
- a container, said container having at least one wall with an outer surface and an inner surface, said inner surface at least partially forming an open volume for accepting waste material for bio-conversion;
- a ramp, said ramp adjoining the inner surface of said at least one wall and continuing along a contour of the inner surface of said container in an incline; and
- a port opening, said port opening adjoining a portion of the ramp; and
- at least one collection tube coupled to at least some of the port opening on the plurality of bio-conversion units.

20. The domestic bio-conversion system as recited in claim 19 above, wherein the plurality of bio-conversion units are portable for manually tending an emptying waste residue.

21. The domestic bio-conversion system as recited in claim 19 above further comprises:
- a rack for vertically supporting said plurality of bio-conversion units.

22. The domestic bio-conversion system as recited in claim 19 above further comprises:
- an automated dispensing apparatus for the dispensing of waste material.

23. A domestic bio-conversion unit for facilitating bio-conversion of waste material comprising:
- a container, said container having a first inner surface, a second inner surface and an offset surface, said offset surface being interposed between and adjoined to said first and second inner surfaces, said first inner surface being laterally offset from said second inner surface by said offset surface
- a ramp, said ramp formed by an inclined portion of said offset surface interposed between and adjoined to said first and second inner surfaces, said ramp continuing along a contour of the first inner surface in an incline and continuing along a contour of the second inner surface in an incline, wherein at least a portion of the ramp having a constant rate of inclination.

24. A method for facilitating bio-conversion of waste material by utilizing a domestic bio-conversion unit comprising:
- depositing waste material on a surface of a disposal volume, wherein disposal volume being confined in said a domestic bio-conversion unit having a container with at least one wall with an outer surface and an inner surface, said inner surface at least partially forming an open volume for accepting waste material for bio-conversion, a ramp adjoining the inner surface of said at least one wall and continuing along a contour of the inner surface of said container in an incline and a port opening adjoining a portion of the ramp;
- bio-converting at least a portion of the putrescent waste in the disposal volume to a plurality of living organisms, wherein the putrescent waste is transformed into waste residue; and
- collecting the plurality of living organisms which migrate out of the disposal volume using the ramp and egress the domestic bio-conversion unit via the port opening.

25. The domestic bio-conversion unit recited in claim 23 above, wherein cross-sectional shapes of said first inner and second inner surfaces are substantially curvilinear.

26. The domestic bio-conversion unit recited in claim 23 above, wherein cross-sectional shapes of said first inner and second inner surfaces are substantially curvilinear and a cross-sectional shape of said ramp is substantially linear.

27. The domestic bio-conversion unit recited in claim 23 above, wherein at least a portion of a cross-sectional shape of said container is curvilinear.

28. The domestic bio-conversion unit recited in claim 23 above further comprises:
- a second ramp, said second ramp formed by an inclined portion of said offset surface interposed between and adjoined to said first and second inner surfaces, said second ramp continuing along a second contour of the first inner surface in an incline and along a second contour of the second inner surface in an incline, wherein at least a portion of the second ramp having a constant rate of inclination.

29. The domestic bio-conversion unit recited in claim 23 further comprises:

a port opening, said port opening adjoining a portion of the ramp.

30. The domestic bio-conversion unit recited in claim 23, wherein said first inner surface and said second inner surface, each being formed in a geometric shape for inhibiting travel of a crawling creature.

31. The domestic bio-conversion unit recited in claim 23 above further comprises:

a lid.

32. The domestic bio-conversion unit recited in claim 23 further comprising:

a rail, said rail adjoining said ramp and continuing along said ramp in an inclined direction.

33. The domestic bio-conversion unit recited in claim 23 above further comprises:

an upper seat, wherein said domestic bio-conversion is used as a toilet for directly processing human waste using larvae.

* * * * *